United States Patent [19]
Pare, Jr. et al.

[11] Patent Number: 6,154,879
[45] Date of Patent: *Nov. 28, 2000

[54] TOKENLESS BIOMETRIC ATM ACCESS SYSTEM

[75] Inventors: David Ferrin Pare, Jr., Berkeley; Ned Hoffman, Sebastopol; Jonathan Alexander Lee, Oakland, all of Calif.

[73] Assignee: SmartTouch, Inc., Berkeley, Calif.

[ * ] Notice: This patent is subject to a terminal disclaimer.

[21] Appl. No.: 09/245,501

[22] Filed: Feb. 5, 1999

Related U.S. Application Data

[63] Continuation of application No. 08/705,399, Aug. 29, 1996, Pat. No. 5,870,723, which is a continuation-in-part of application No. 08/442,895, May 17, 1995, Pat. No. 5,613,012, which is a continuation-in-part of application No. 08/345,523, Nov. 28, 1994, Pat. No. 5,615,277.

[51] Int. Cl.[7] .............................. G06K 9/00; G06F 17/60
[52] U.S. Cl. ................................... 902/3; 902/4; 705/26; 705/35; 705/39; 380/23; 380/24; 380/25
[58] Field of Search ................................. 705/26, 34, 39, 705/40, 35; 902/3, 4; 382/115; 380/4, 52, 49, 23–25; 235/492, 380, 487

[56] References Cited

U.S. PATENT DOCUMENTS

| 4,321,672 | 3/1982 | Braun ....................................... 364/408 |
| 4,390,968 | 6/1983 | Hennessy ................................. 364/900 |
| 4,675,815 | 6/1987 | Kuroki ....................................... 379/37 |

(List continued on next page.)

OTHER PUBLICATIONS

Janie Toll, "News release: Veridicom showcases new customers and applications at COMDEX", from http://veridicom.com/press/ Nov. 1998.

Spring Technologies, Inc. 's disclosure about tokenless technology from WWW site http://www.springtechnic.com/sportscan.html. Nov. 1998.

EPO Application 0651357A1, Transaction Processing System Published Mar. 5, 1995–Holloway.

EPO Application 0581421 A1, Method and System for Certificate Based Alias Detection Published Feb. 2, 1994–Gajnak.

PCT Publication WO 95/13591, Fingerprint Analyzing and Encoding System Takhar.

PCT Publication WO 98/25227, Biometric Security Encryption System Hamid.

American Society for Industrial Security, Security Management, V. 37, n11 (Nov. 1993): 17–19 Anderson et al.

When Data Warehouse become Open House, D. Radcliff Software Management, v16 n11 Nov. 26, 1996.

(List continued on next page.)

*Primary Examiner*—James P. Trammell
*Assistant Examiner*—Cuong H. Nguyen
*Attorney, Agent, or Firm*—Marger Johnson & McCollom, P.C.

[57] ABSTRACT

The present invention provides a method for tokenless biometric access to financial accounts at an institution using an automated teller machine. This method comprises a user registration step, wherein a user registers with an electronic identicator one or more registration biometric samples and one or more user financial accounts. During an initiation step, the user initiates an account access at an automated teller machine by submitting at least one bid biometric sample directly from the user's person, wherein no portable man-made memory devices such as smartcards or swipe cards are used by the user. In at least one transmission step, an account access request message comprising the user's bid biometric is forwarded from the automated teller machine to the electronic identicator. During a user identification step, the electronic identicator compares the bid biometric sample in the account access request message with a registration biometric sample, to produce either a successful or failed identification of the user. Upon successful identification of the user, at least one financial account of the user is retrieved, and in an access step, after successful identification of the user and successful financial account retrieval, the user is allowed to access the user financial account.

27 Claims, 15 Drawing Sheets

U.S. PATENT DOCUMENTS

| | | | |
|---|---|---|---|
| 4,799,156 | 1/1989 | Shavit | 364/401 |
| 4,821,118 | 4/1989 | Lafreniere | 358/108 |
| 4,837,422 | 6/1989 | Dethloff et al. | 364/408 |
| 4,868,376 | 9/1989 | Lessin et al. | 235/492 |
| 4,926,480 | 5/1990 | Chaum | 380/23 |
| 4,961,142 | 10/1990 | Elliott et al. | 364/408 |
| 4,993,068 | 2/1991 | Piosenka et al. | 380/23 |
| 4,995,086 | 2/1991 | Lilley et al. | 383/4 |
| 4,998,279 | 3/1991 | Weiss | 340/825 |
| 5,036,461 | 7/1991 | Elliott et al. . | |
| 5,054,089 | 10/1991 | Uchida et al. | 382/4 |
| 5,095,194 | 3/1992 | Barbanell | 235/379 |
| 5,109,427 | 4/1992 | Yang | 382/4 |
| 5,109,428 | 4/1992 | Igaki et al. | 382/5 |
| 5,144,680 | 9/1992 | Kobayashi et al. | 382/4 |
| 5,146,102 | 9/1992 | Higuchi et al. | 250/556 |
| 5,168,520 | 12/1992 | Weiss | 380/23 |
| 5,180,901 | 1/1993 | Hiramatsu | 235/380 |
| 5,191,611 | 3/1993 | Lang | 380/25 |
| 5,210,797 | 5/1993 | Usui et al. | 382/4 |
| 5,222,152 | 6/1993 | Fishbine et al. | 382/2 |
| 5,224,164 | 6/1993 | Elsner et al. | 380/44 |
| 5,229,764 | 7/1993 | Matchett et al. | 340/825 |
| 5,230,025 | 7/1993 | Fisfbine et al. | 382/4 |
| 5,239,583 | 8/1993 | Parrillo | 380/23 |
| 5,241,606 | 8/1993 | Horie | 382/4 |
| 5,251,259 | 10/1993 | Mosley | 380/23 |
| 5,265,162 | 11/1993 | Bush et al. | 380/24 |
| 5,276,314 | 1/1994 | Martino et al. | 235/380 |
| 5,280,527 | 1/1994 | Gullman et al. | 380/23 |
| 5,321,242 | 6/1994 | Heath, Jr. | 235/382 |
| 5,325,442 | 6/1994 | Knapp | 382/4 |
| 5,335,288 | 8/1994 | Faulkner | 381/2 |
| 5,343,529 | 8/1994 | Goldfine et al. | 380/23 |
| 5,351,303 | 9/1994 | Willmore | 382/4 |
| 5,354,974 | 10/1994 | Eisenberg | 235/379 |
| 5,359,669 | 10/1994 | Shanley | 382/6 |
| 5,386,104 | 1/1995 | Sime | 235/379 |
| 5,499,288 | 3/1996 | Hunt | 379/88 |
| 5,533,123 | 7/1996 | Force et al. | 380/4 |
| 5,561,718 | 10/1996 | Trew | 379/266 |
| 5,604,802 | 2/1997 | Holloway | 380/24 |
| 5,613,012 | 3/1997 | Hoffman et al. | 382/115 |
| 5,613,102 | 3/1997 | Hoffman et al. | 382/115 |
| 5,615,277 | 3/1997 | Hoffman | 382/115 |
| 5,636,282 | 6/1997 | Holmquist | 380/25 |
| 5,745,555 | 4/1998 | Mark | 37/95 |
| 5,764,789 | 6/1998 | Pare, Jr. et al. | 382/115 |
| 5,802,199 | 9/1998 | Pare, Jr. et al. | 382/115 |
| 5,805,719 | 9/1998 | Pare, Jr. et al. | 382/115 |
| 5,826,245 | 10/1998 | Sandberg-Diment | 705/44 |
| 5,838,812 | 11/1998 | Pare, Jr. et al. | 705/44 |
| 5,870,723 | 2/1999 | Hoffman et al. | 705/39 |

OTHER PUBLICATIONS

A Credit Union Points a Finger at Biometrics, Anonymous Bank Network News, v15 n16 Jan. 13, 1997.

Scanning Lets Fingerprints do talking, J. Hall Toronto Star, PA6 May 15, 1997.

CompUSA Tests Fingerprints to Help Secure Transactions, R. Scally Discount Store News v36 n10 May 19, 1997.

TOKENLESS BIOMETRIC ATM ACCESS SYSTEM

CROSS-REFERENCE

This application is a continuation of application Ser. No. 08/705,399, filed on Aug. 29, 1996 now U.S. Pat. No. 5,870,723, which is a continuation-in-part of U.S. application Ser. No. 08/442,895 filed on May 17, 1995 now U.S. Pat. No. 5,613,012 which is a continuation-in-part of U.S. application Ser. No. 08/345,523, filed on Nov. 28, 1994, now U.S. Pat. No. 5,615,277.

BACKGROUND

The use of a token, an inanimate object which confers a capability to the user presenting it, is pervasive in today's financial world. At the heart of every transaction is a money transfer enabled by a token, such as a plastic debit or credit swipe card, which acts to identify both the user as well as the financial account being accessed.

From their inception in the late 1970s, token-based systems for accessing financial services have grown increasingly more prevalent in the banking industry. However, as token-based systems access have become more popular with users, they have also become more popular with criminals intent on perpetrating fraud. Currently, fraud losses in the financial industry stem from many different areas, but they are mainly due to either stolen or counterfeit cards.

Generally, debit cards are used in conjunction with a personal identification number (PIN). The PIN helps to prevent lost or stolen cards from being used by criminals, but over time various strategies have been used to obtain PINs from unwary cardholders. Such strategies include Trojan horse automated teller machines (ATMs) in shopping malls that dispense cash but record the PIN, to fraudulent debit devices that also record the PIN, to criminals with binoculars that watch cardholders enter PINs at ATMs. The subsequently manufactured counterfeit debit cards are then used in various ATM machines to fraudulently withdraw funds until the account is emptied.

User-based fraud for debit cards is also on the rise. Users intent on this sort of fraud will claim that they lost their card, say that their PIN was written on the card, and then withdraw money from their account using card, and then refuse to be responsible for the loss.

The financial industry is constantly taking steps to improve the security of tokens, such as debit cards and new smartcards. However, the linkage between the user and his token remains tenuous, and that is the fundamental reason behind the increasing card fraud.

One solution that would reduce counterfeit-card fraud involves using a smartcard that includes a biometric. In this approach, authenticated biometrics are recorded from a user of known identity and stored for future reference on a token. In every subsequent account access, the user is required to physically enter the requested biometric, which is then compared to the authenticated biometric on the token to determine if the two match in order to verify user identity.

Various biometrics have been suggested for use with smartcards, such as fingerprints, hand prints, voice prints, retinal images, handwriting samples and the like. However, the biometrics are generally stored on a token in electronic form, and thus the biometrics can be fraudulently copied and reproduced. Because the comparison and verification process is not isolated from the hardware and software directly used by the user attempting access, a significant risk of fraud still exists.

An example of another token-based biometric smartcard system can be found in U.S. Pat. No. 5,280,527 to Gullman et al. In Gullman's system, the user must carry and present a credit card sized token (referred to as a biometric security apparatus) containing a microchip in which is recorded characteristics of the authorized user's voice. In order to initiate the access procedure, the user must insert the token into a ATM such as an ATM, and then speak into the ATM to provide a biometric sample for comparison with an authenticated sample stored in the microchip of the presented token. If a match is found, the remote ATM signals the host computer that the account access should be permitted, or may prompt the user for an additional code, such as a PIN which is also stored on the token, before authorizing the account access.

Although Gullman's reliance on comparing biometrics reduces the risk of unauthorized access as compared to PIN codes, Gullman's use of the token as the repository for the authenticating data combined with Gullman's failure to isolate the identity verification process from the possibility of tampering greatly diminishes any improvement to fraud resistance resulting from the replacement of a PIN with a biometric. Further, the systems mains inconvenient to the user because it requires the presentation of a token in order to horizon an account access.

Uniformly, the above patent that disclose financial authorization systems teach away from biometric recognition N out the use of tokens. Reasons cited for such teachings range from storage requirements for biometric recognition systems to significant time lapses in identification of a large number of individuals, even for the most powerful computers.

Furthermore, any smartcard-based system will cost significantly more than the current magnetic stripe card systems currently in place. A PIN smartcard costs perhaps $3, and a biometric smartcard will cost $5. In addition, each station that currently accepts existing debit cards would need a smartcard reader, and if biometrics are required, a biometric scanner will also have to be attached to the reader as well.

This costly price tag has else industry to look for additional applications of the smartcard beyond simple banking and debit needs. It is envisioned that in addition to storing credit and debit account numbers and biometric or PIN authentication information, smartcards may also phone numbers, frequent flyer miles, coupons obtained from stores, a transaction try, electronic cash usable at tollbooths and on public transit systems, as well as the user's name, vital statistics, and perhaps even medical records.

The net result of this "smartening" of the token is increasing centralization of functions and increasing dependence on the token itself, resulting in increased vulnerability for the user. Given the number of functions that the smartcard will be performing, the loss or damage of this all-important card will be excruciatingly inconvenient for the cardholder. Being without such a card will financially incapacitate the cardholder until it is replaced. Additionally, losing a card full of electronic cash may also result in a real financial loss as well.

Thus, after spending vast sums of money, the resulting system will be somewhat more secure, but will levy heavier penalties on the user for destruction or loss of the card.

To date, the banking industry has had a simple equation to balance: in order to reduce fraud, the cost of the card must increase. This cost is passed along to users. As a result, there has long been a need for an ATM access system that is highly fraud-resistant, practical, convenient for the user, and yet cost-effective to deploy.

There is also a need for an ATM access system that identifies the user, as opposed to merely verifying a user's possession of any physical objects that can be freely transferred. This will result in a dramatic decrease in fraud, as only the authentic user can access his or her account.

A further need in an account access system is ensuring user convenience by providing access without forcing the user to possess, carry, and present one or more man-made memory devices in order to authorize an account access. All parties intent on fighting fraud recognize that any system that solves the fraud problem must take the issue of convenience into account, however the fundamental yet unrecognized truth of the situation is, the card itself is extremely inconvenient for the user. This may not be initially obvious, but anyone who has lost a card, left a card at home, or had a card stolen knows well the keenly and immediately-felt inconvenience during the card's absence.

Yet another need in the industry is for a system that greatly reduces or eliminates the need to memorize cumbersome codes in order to access ones financial accounts. Yet another need in the industry is for a system that eliminates the need to memorize PIN codes.

There is further a need for a system that affords a user the ability to alert authorities that a third party is coercing the account access without the third party being aware that an alert has been generated. There is also a need for a system that is able to effect, unknown to the coercing third party, temporary restrictions on the types and amounts of account accesses that can be undertaken.

Lastly, such a system must be affordable and flexible enough to be operatively compatible with existing networks having a variety of electronic access devices and system configurations.

SUMMARY

The present invention satisfies these needs by providing a method for tokenless biometric access to financial accounts at an institution using an automated teller machine. This method comprises a user registration step, wherein a user registers with an electronic identicator one or more registration biometric samples and one or more user financial accounts. During an initiation step, the user initiates an account access at an automated teller machine by submitting at least one bid biometric sample directly from the user's person, wherein no portable man-made memory devices such as smartcards or swipe cards are used by the user. In at least one transmission step, an account access request message comprising the user's bid biometric is forwarded from the automated teller machine to the electronic identicator. During a user identification step, the electronic identicator compares the bid biometric sample in the account access request message with a registration biometric sample, to produce either a successful or failed identification of the user. Upon successful identification of the user, at least one financial account of the user is retrieved, and in an access step, after successful identification of the user and successful financial account retrieval, the user is allowed to access the user financial account.

This method preferably includes a method whereby the user registers a personal identification number with the electronic identicator, which is used by the electronic identicator to identify the user.

Thus, any financial operation such as withdrawing cash, depositing funds, transferring funds between accounts, obtaining account balances, purchasing products, and paying bills is performed.

The tokenless biometric access device uses an automated teller machine, such as those of banks and other financial institutions. An electronic identicator compares, optionally remote from the electronic identicator compares the bid and registration biometric samples of a user to produce either a successful or failed identification of the user. The user submits a biometric sample to the electronic identicator through a biometric input apparatus. The registrant user must have at least one financial account, where an account retrieval module is used to retrieve the registered financial accounts of a user upon successful identification of that user. An execution module optionally debits or credits the user's financial account. It is understood that the device requires no man made tokens such as cards or smartcards are presented for submitting a bid biometric sample to the electronic identicator.

DETAILED DESCRIPTION

The invention provides a tokenless method for identifying users for the purpose of authorizing ATM access for consumers. It is the essence of this invention that consumers conduct these transactions without the use of a personal identification number ("PIN") or any tokens, such as debit cards.

Figure 1:
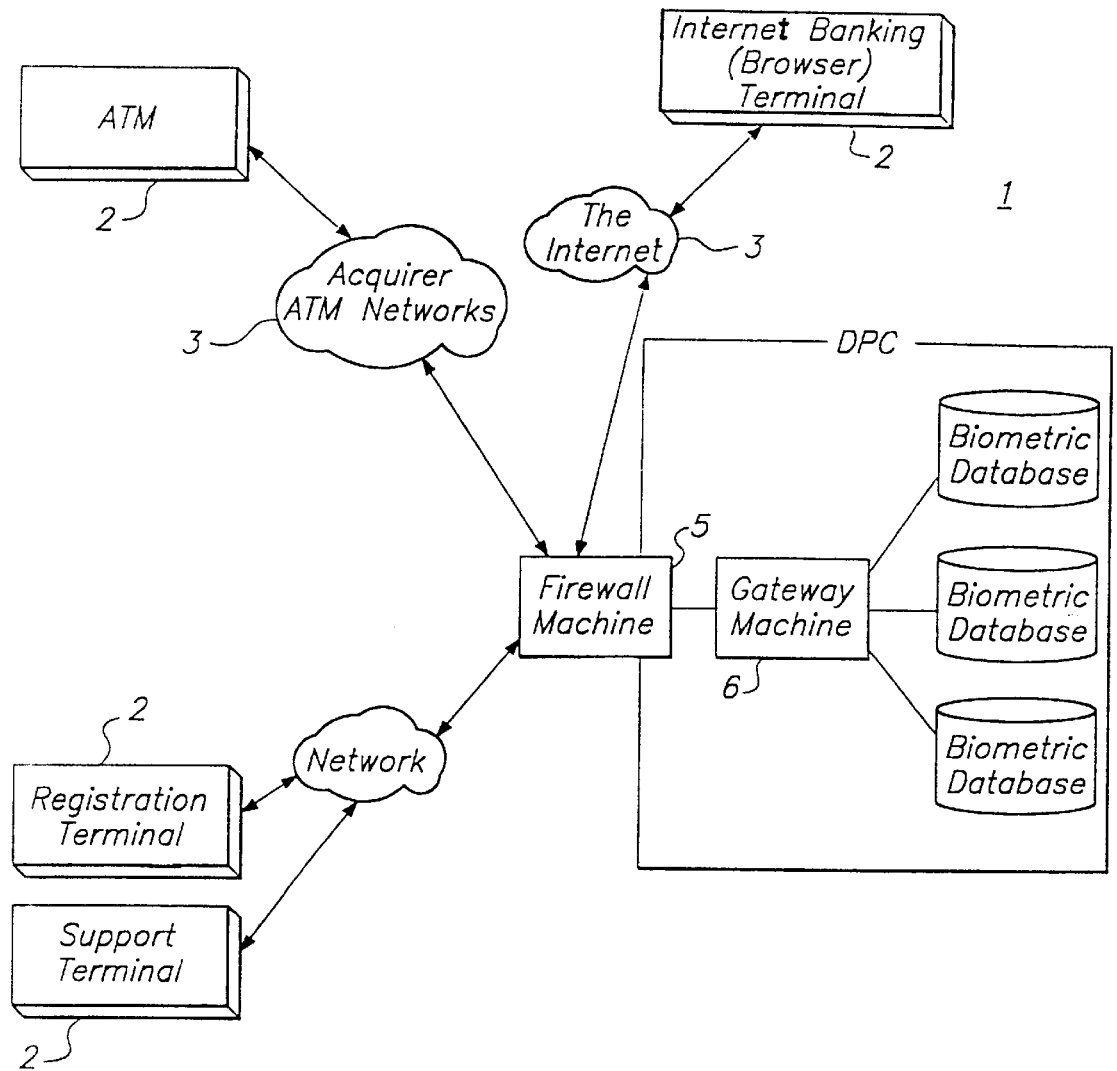
FIG. 1 is an overview diagram of the preferred embodiment of the system of the present invention.

Turning now to the figures, the overall configuration of the invention and its components are shown in FIG. 1.

Figure 2:
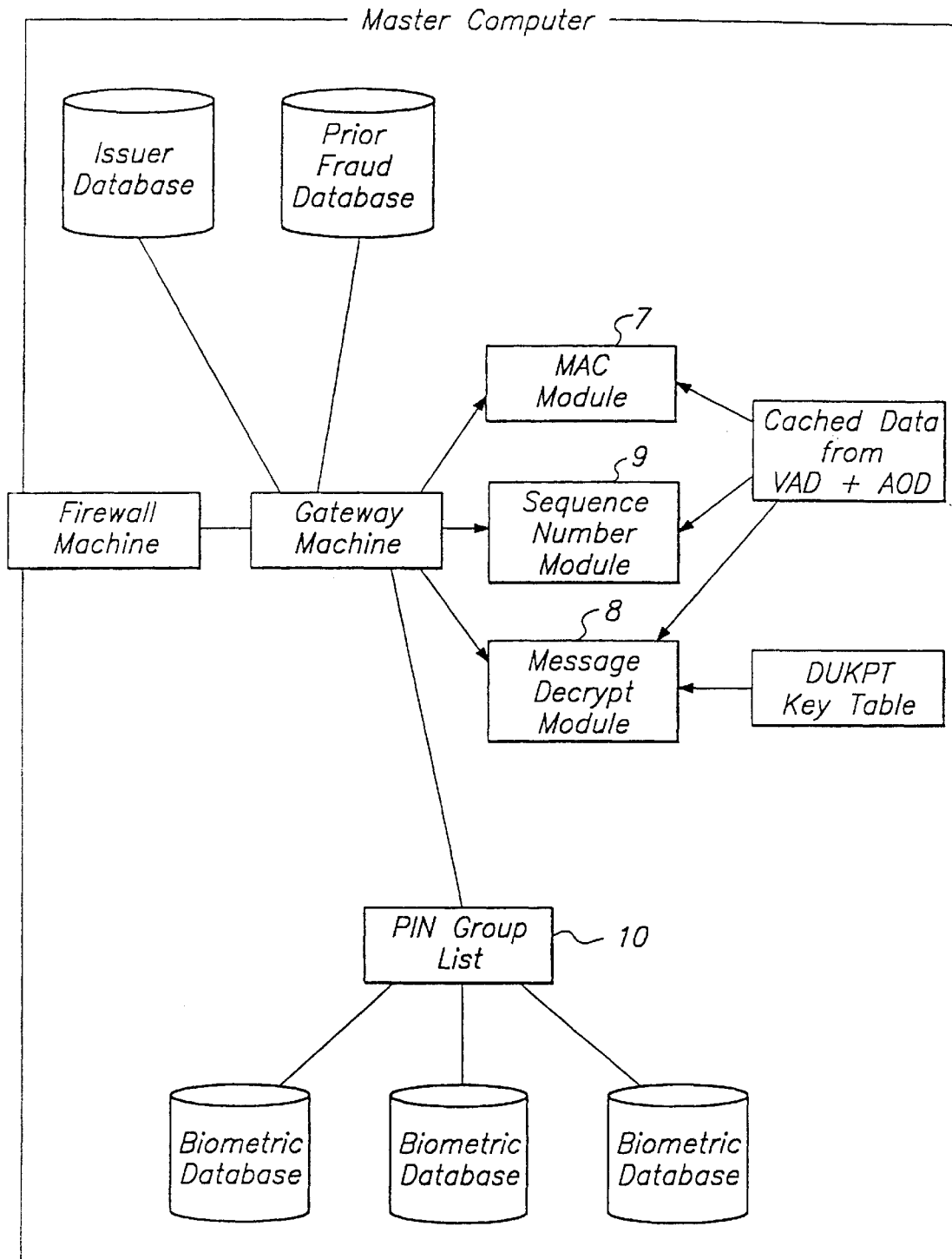
FIG. 2 is a diagram of the preferred embodiment of the Data Processing Center and its internal databases and execution modules.
Figure 3:
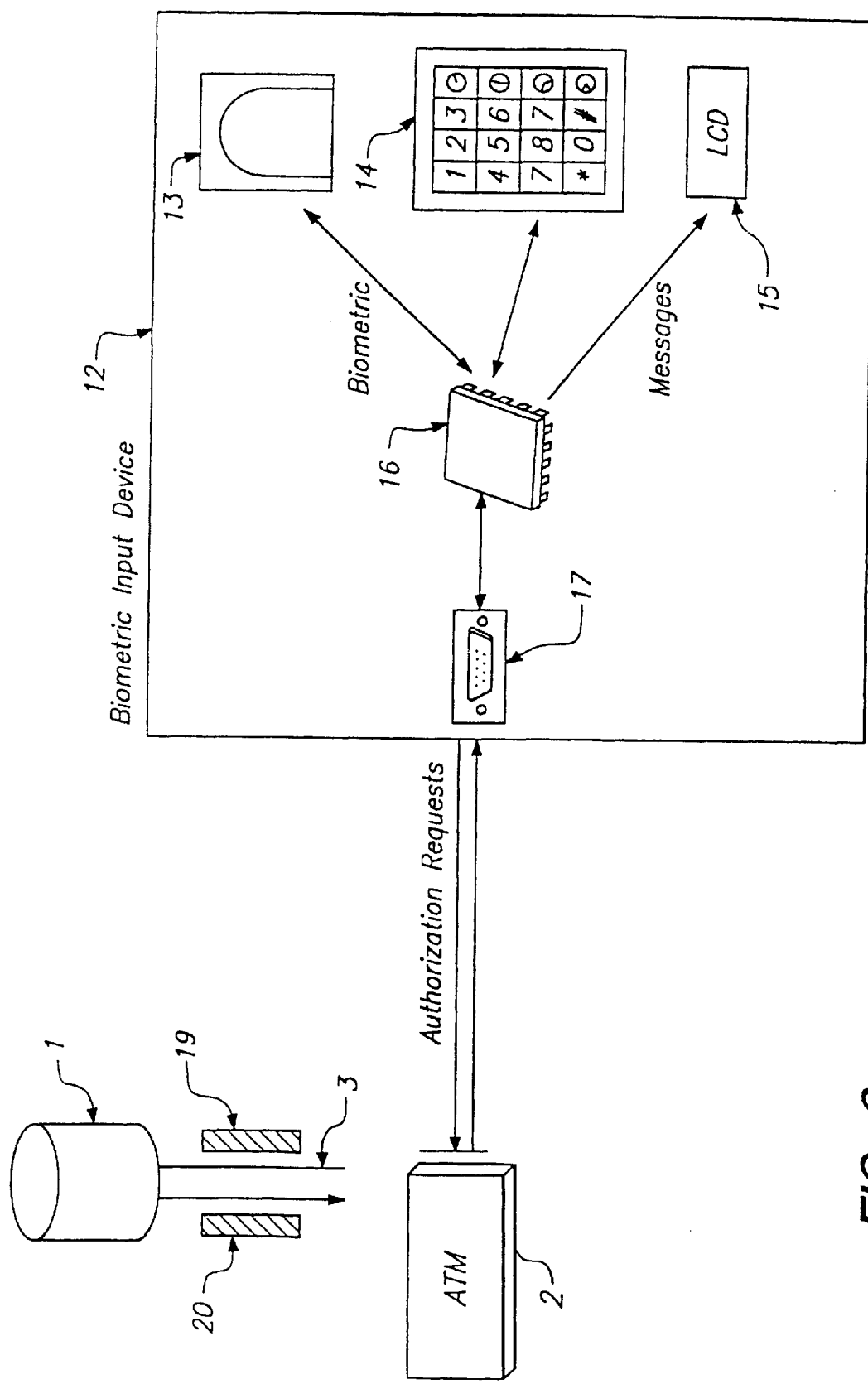
FIG. 3 is a diagram of the ATM terminal, a biometric input apparatus and components, and the interconnections between them.

Essentially a electronic identicator Data Processing Center (DPC) 1 is connected to at least one ATM 2 through various types of communication means 3. The DPC is also connected and communicates with independent computer networks. The DPC contains several databases and software execution modules as shown in FIG. 2. In a preferred embodiment of the invention, the databases are backed up or "mirrored" in distinct physical locations for safety reasons. The Firewall Machine 5 is responsible for prevention of electronic intrusion of the system while the Gateway Machine 6 is responsible for routing all requests from the user, including adding, deleting and otherwise modifying all databases. In a preferred embodiment, some of the communication between the ATM and the DPC are encrypted for enhanced security. The Gateway Machine is also responsible for decryption and de-packaging of encrypted data that has arrived from the ATMs using the MACM module 7, MDM module 8, and the SNM module 9. The BGL module 10, and the IML module (not shown) are used to locate the biometric number. FIG. 3 depicts an example of a ATM 2 and the biometric input device 12, which has a biometric scanner 13, data entry means such as a key pad 14, and a display panel 15. The biometric scanner can be any one of fingerprint scanner, voice input device (microphone), palm print scanner, retinal scanner or the like, although the fingerprint scanner will be used as an example. The biometric input device is further equipped with computing modules 16, device drivers, and erasable and non-erasable memory modules. The biometric input device communicates with the ATM through preferably a serial port 17. The ATM 2 communicates through a modem 18 with the DPC 1 through messages 19 and responses 20 using one of the interconnecting means in FIG. 1 such as a cable TV network, cellular telephone network, telephone network, the Internet, or an X.25 network.

Figure 4:
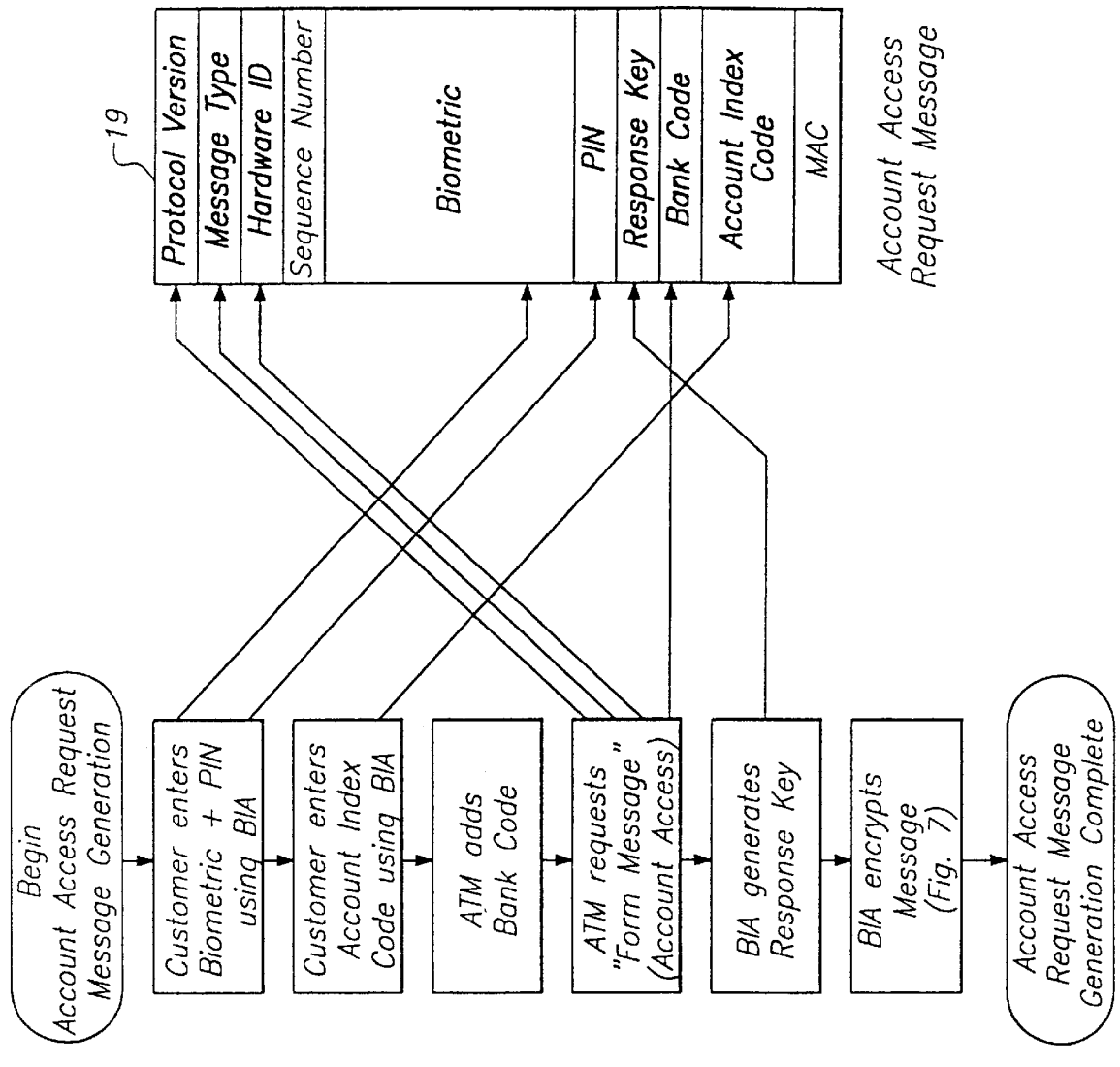
FIG. 4 is a flowchart depicting the generation of an account access request message.
Figure 6:
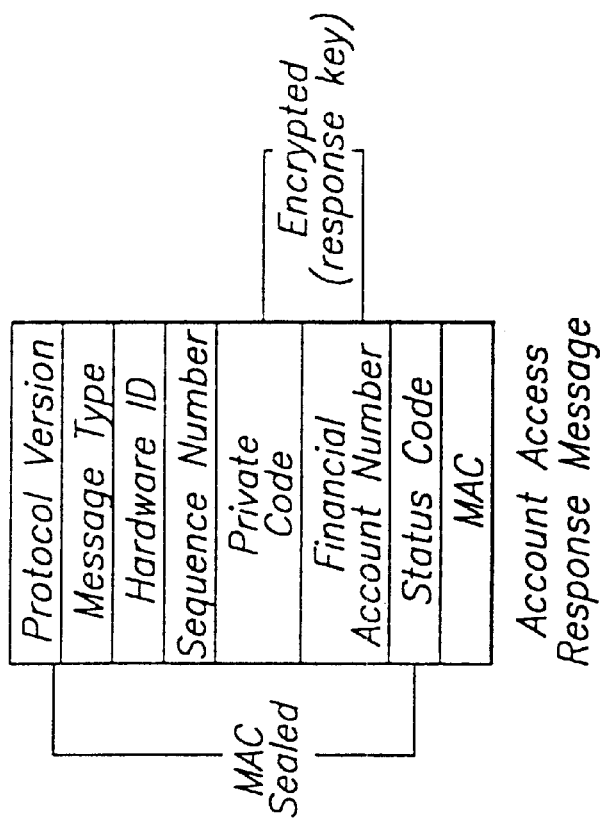
FIG. 6 is a visual representation of the account access response message.
Figure 5:
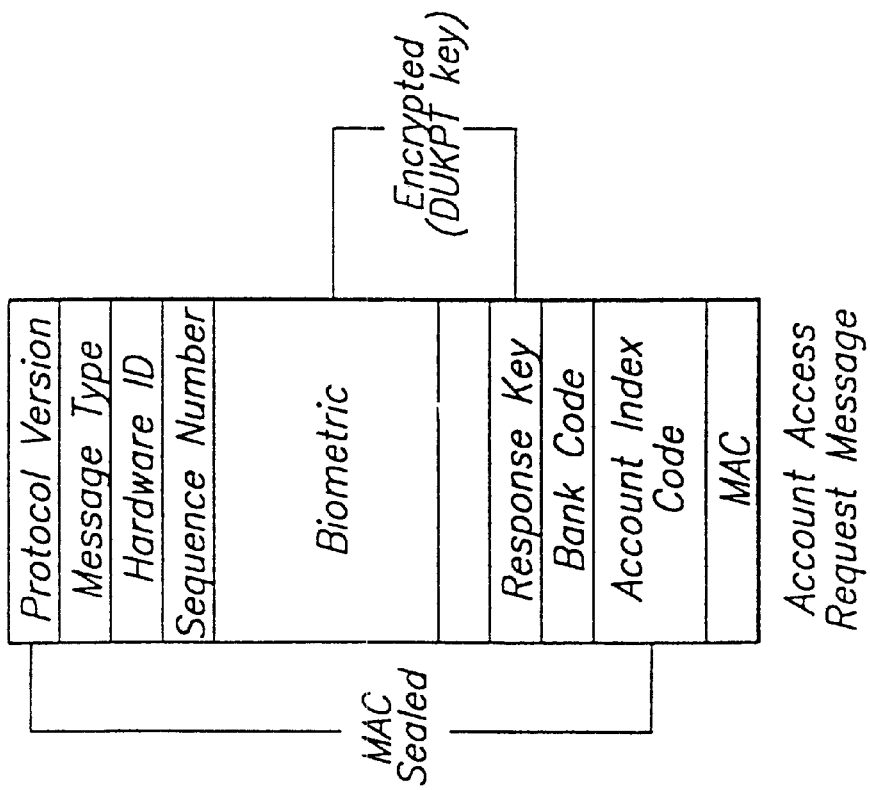
FIG. 5 is a visual representation of the account access request message.
Figure 7:
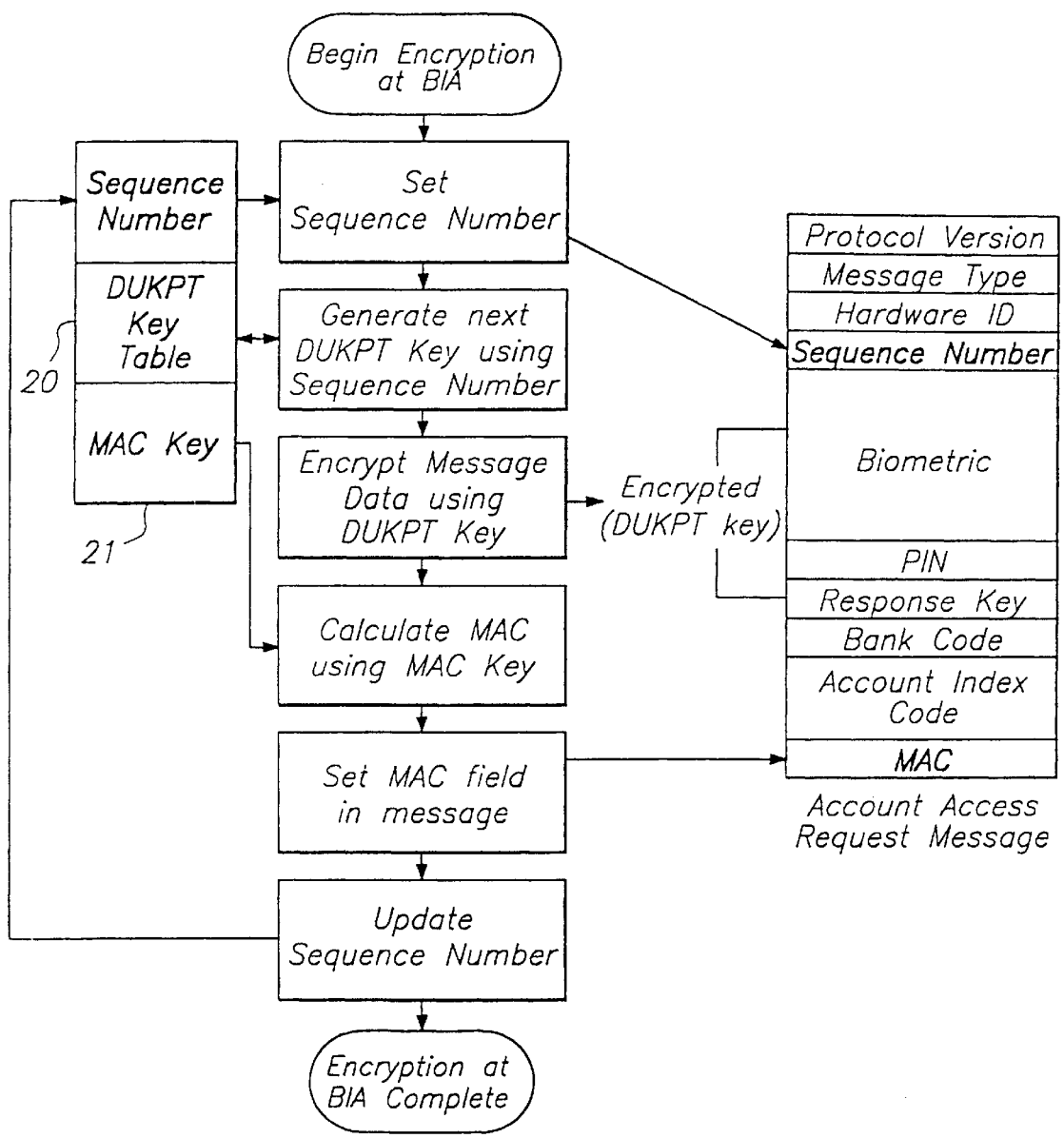
FIG. 7 is a flow chart depicting the data encryption and sealing process at the biometric input apparatus.
Figure 8:
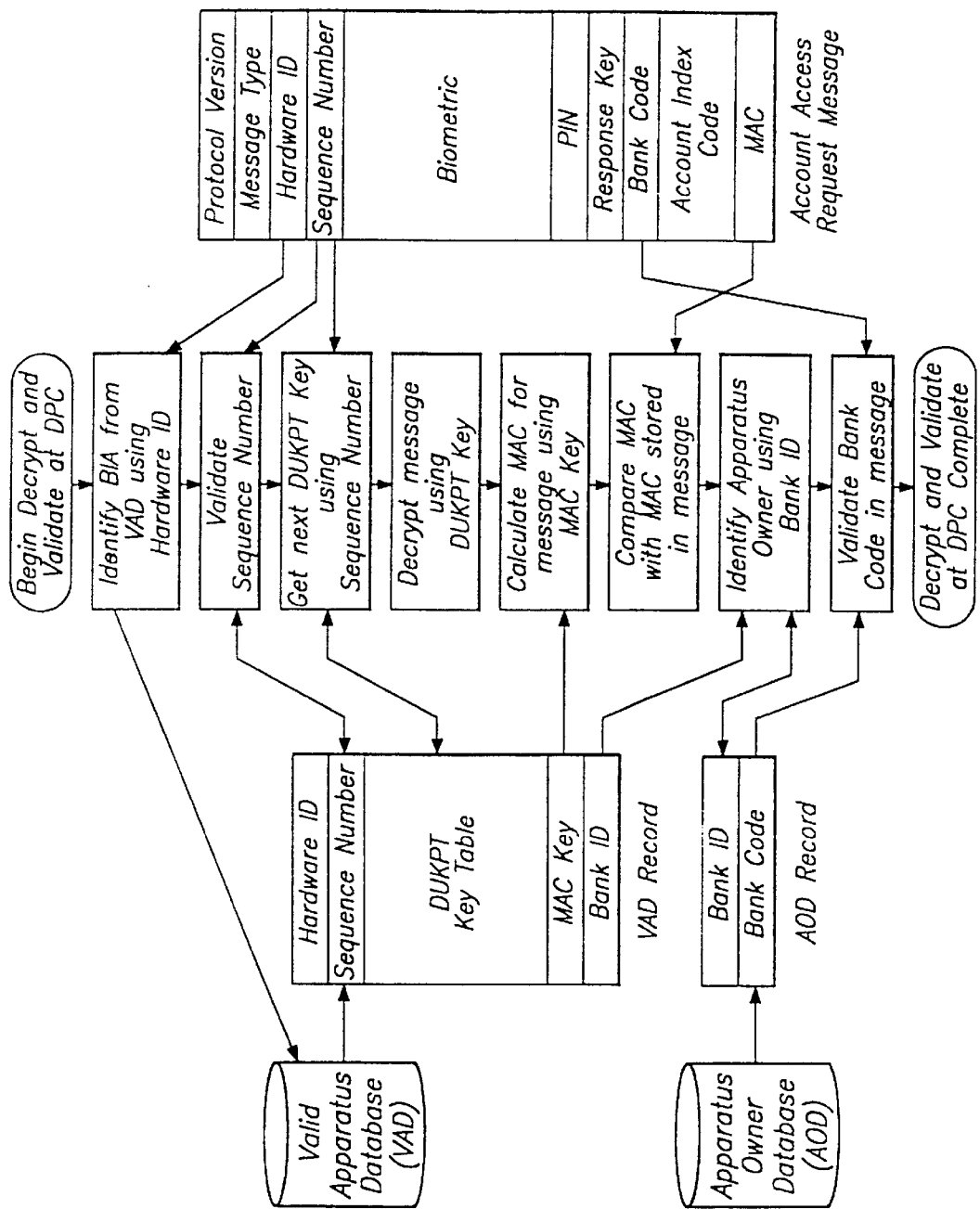
FIG. 8 is a flow chart depicting the message decryption and the validation process at the DPC.
Figure 9:
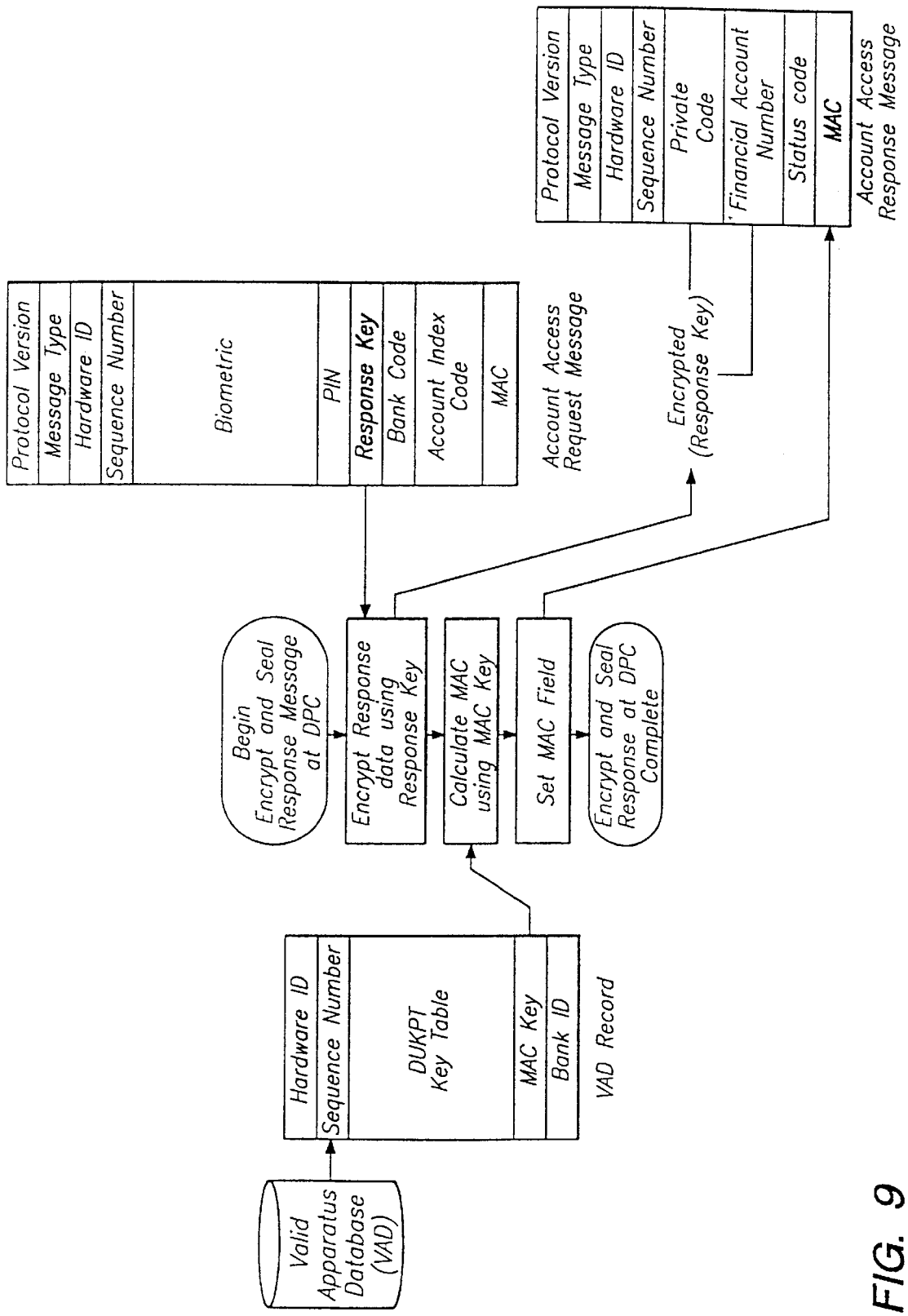
FIG. 9 is a flow chart depicting the data encryption and sealing of an account access response message at the DPC.
Figure 10:
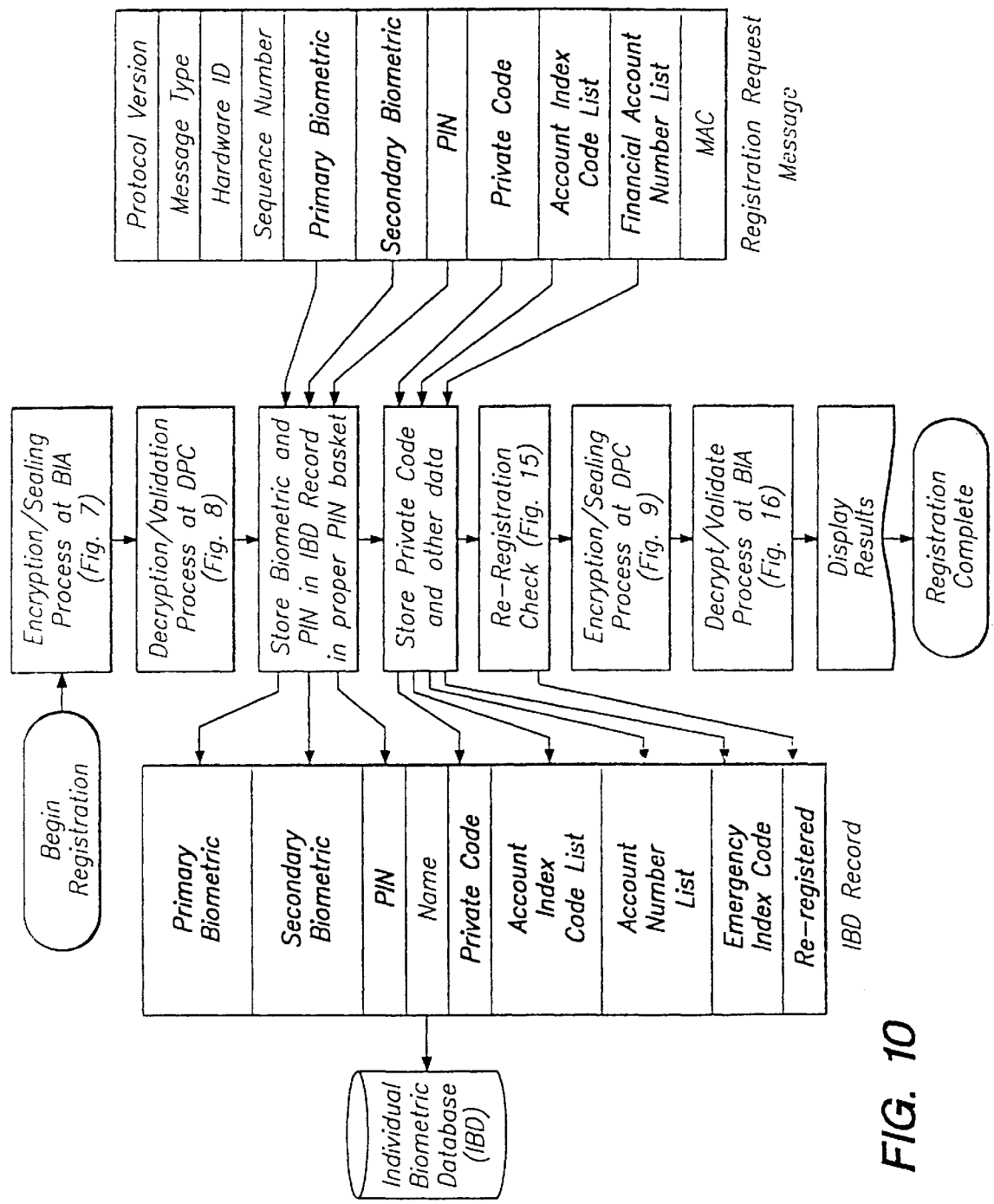
FIG. 10 is an overview flowchart of the user registration process.
Figure 11:
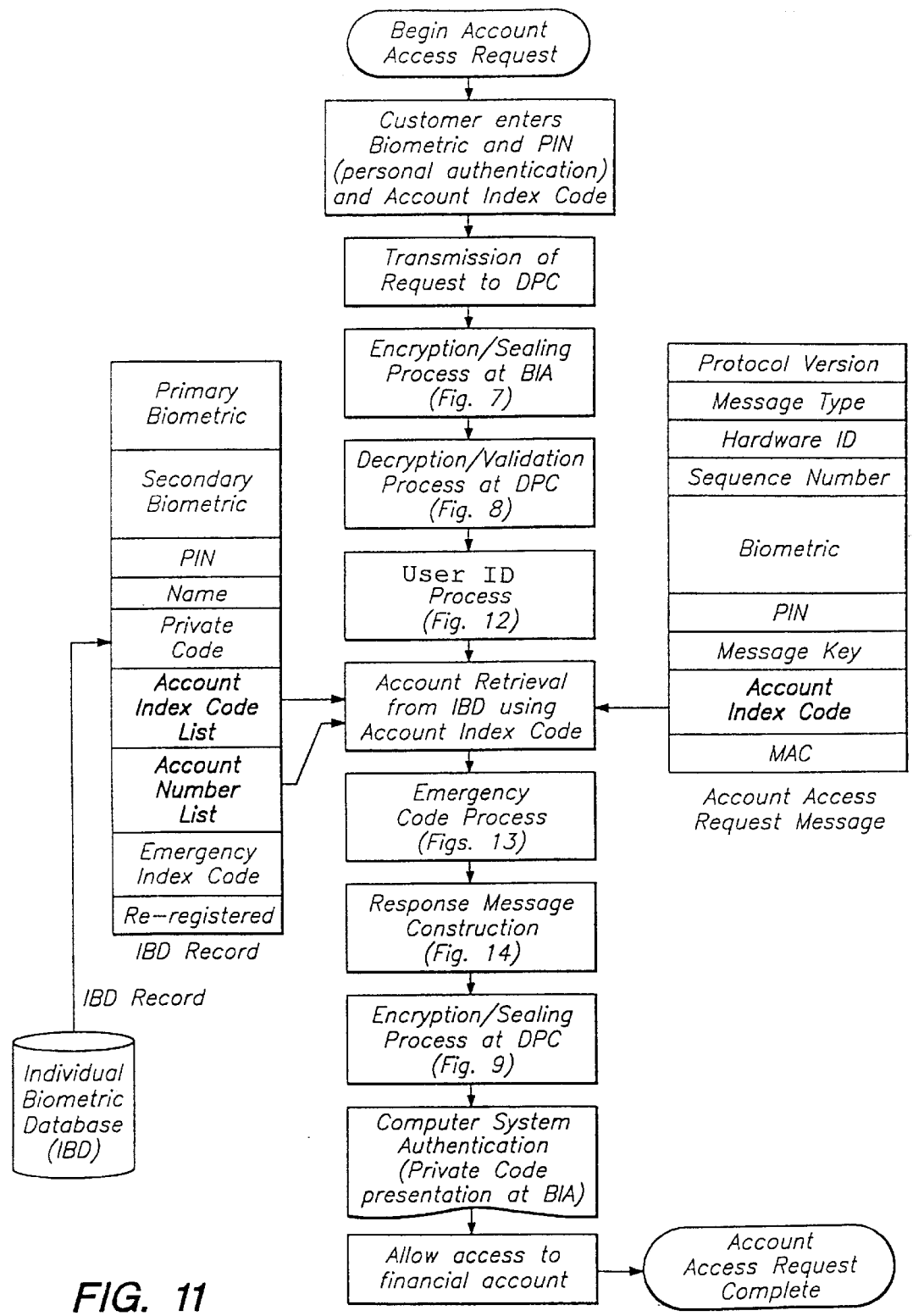
FIG. 11 is an overview flowchart of the user account access process.
Figure 12:
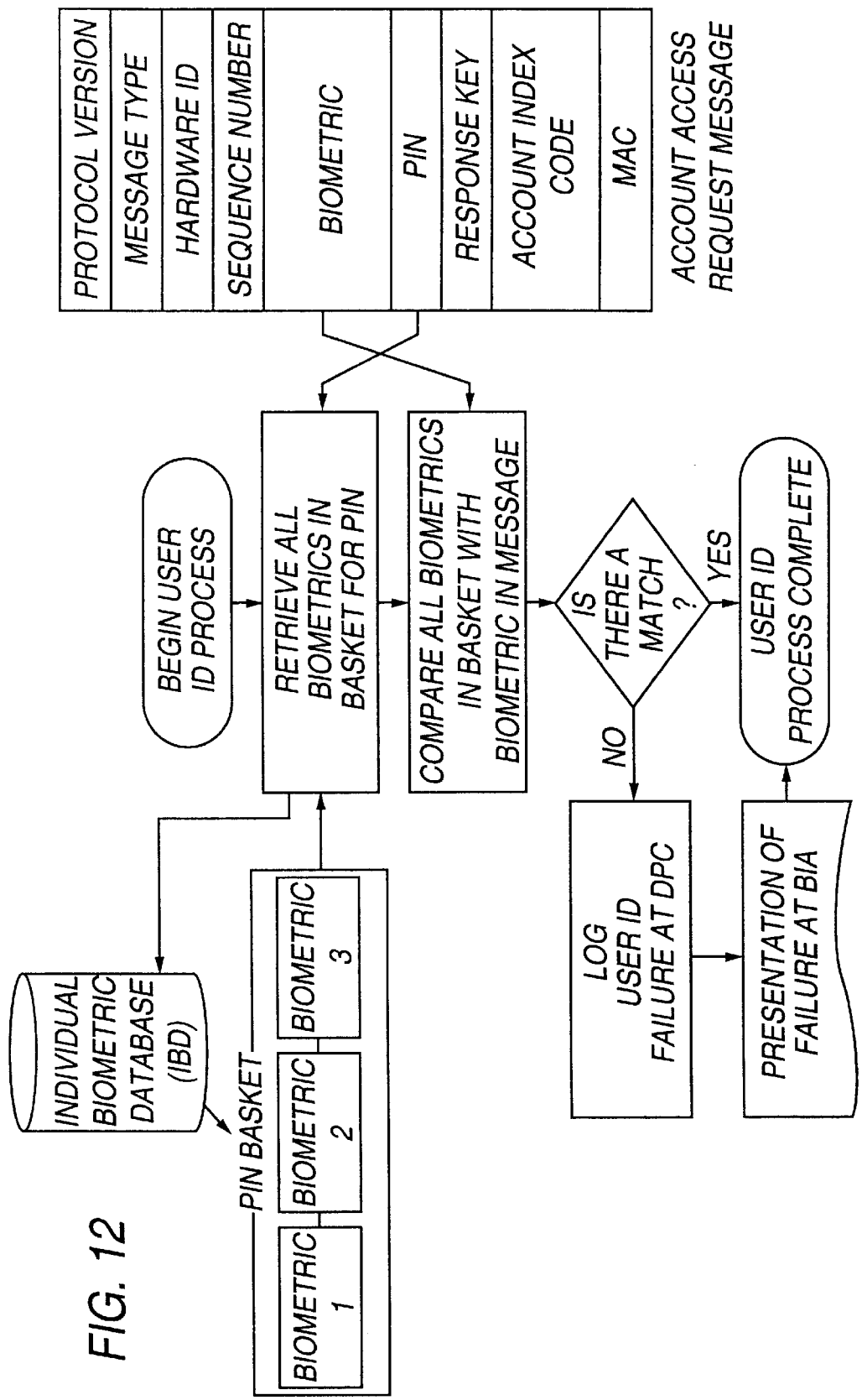
FIG. 12 is a flowchart depicting a user identification step using the preferred embodiment of biometric and PIN from the account access request message at the DPC.
Figure 13:
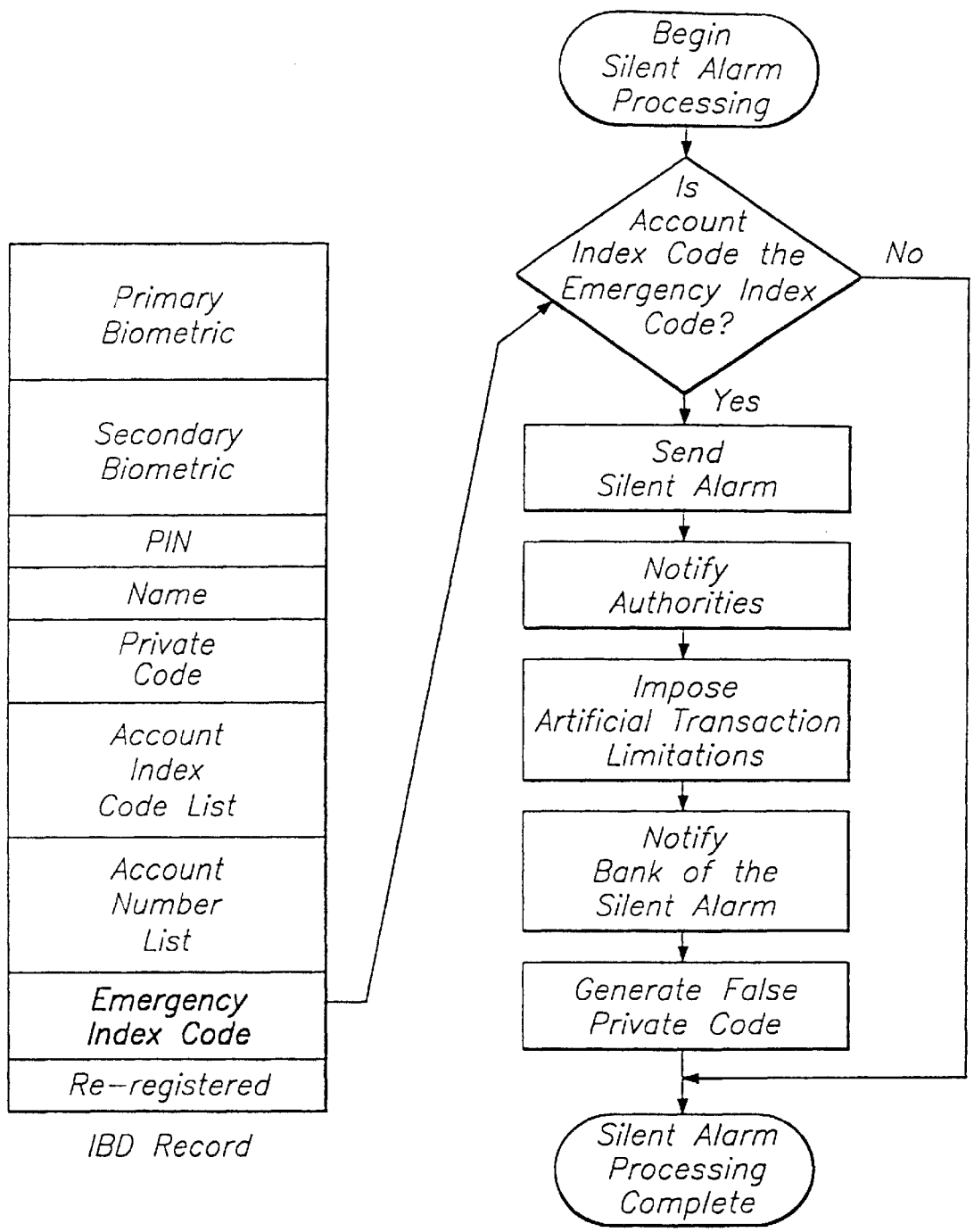
FIG. 13 is a flowchart depicting the silent alarm process using the account access response message at the DPC.
Figure 14:
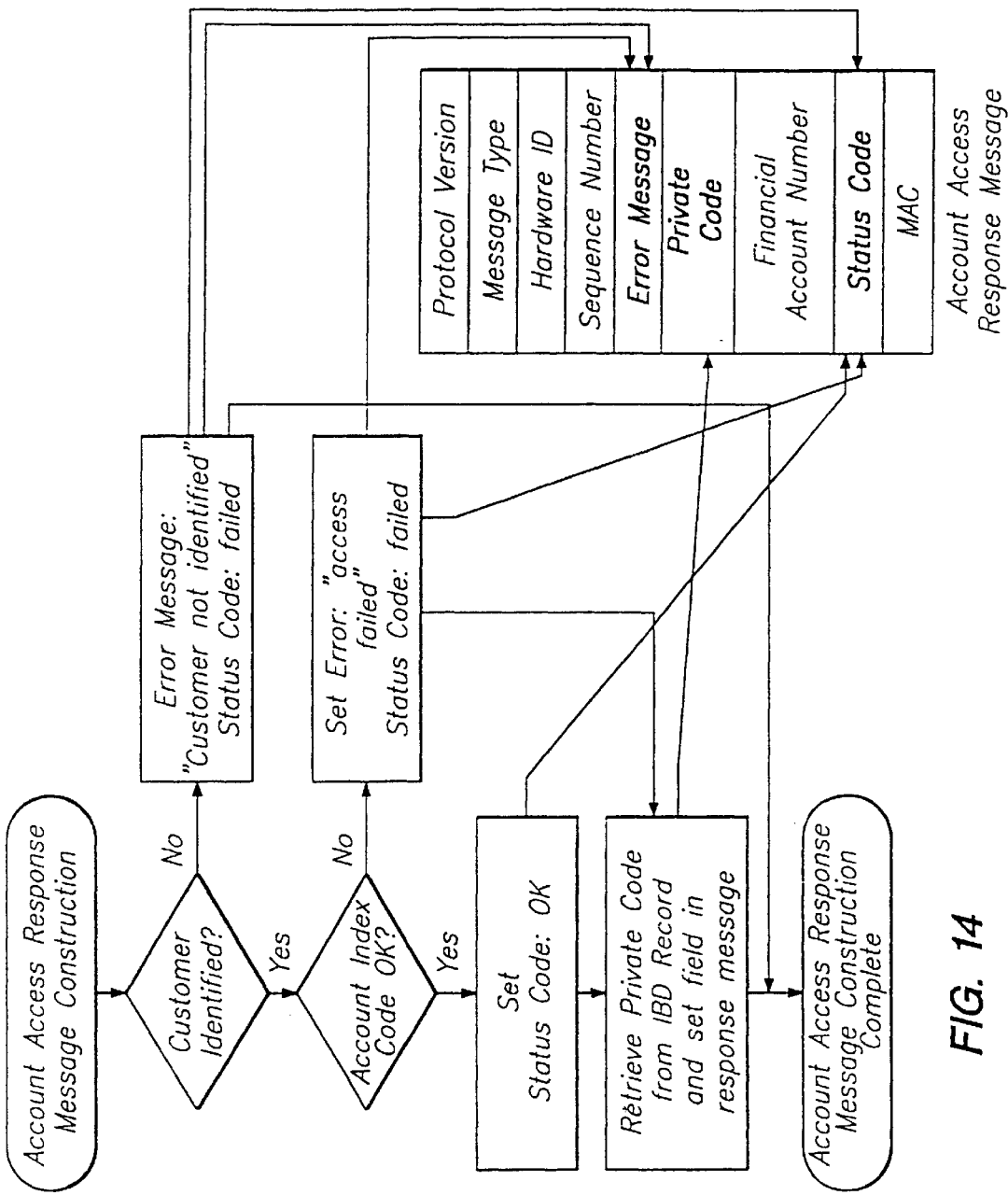
FIG. 14 is a flowchart depicting the generation of an account access request message at the DPC.
Figure 15:
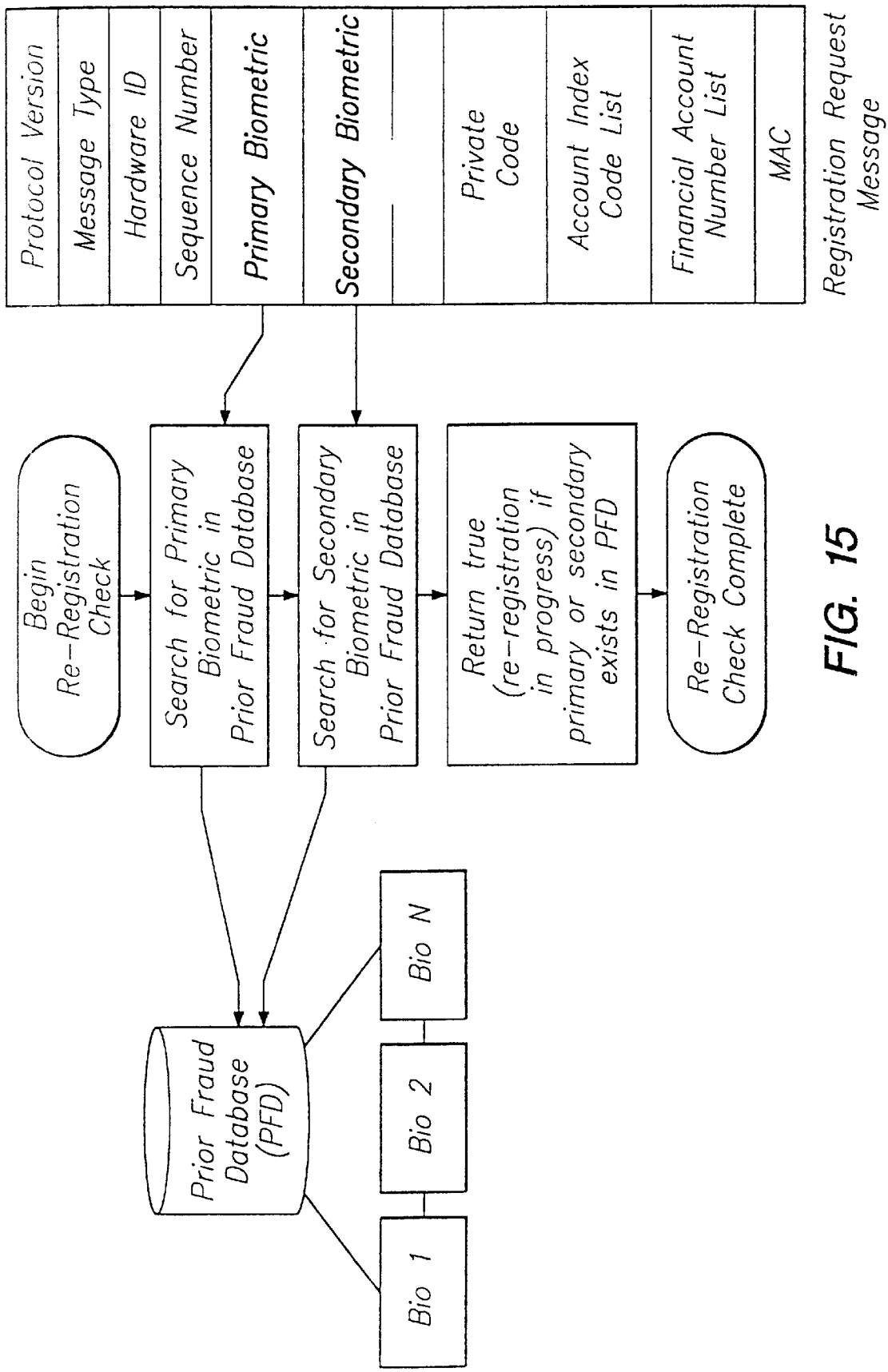
FIG. 15 is a flowchart depicting the re-registration check step at the DPC.
Figure 16:
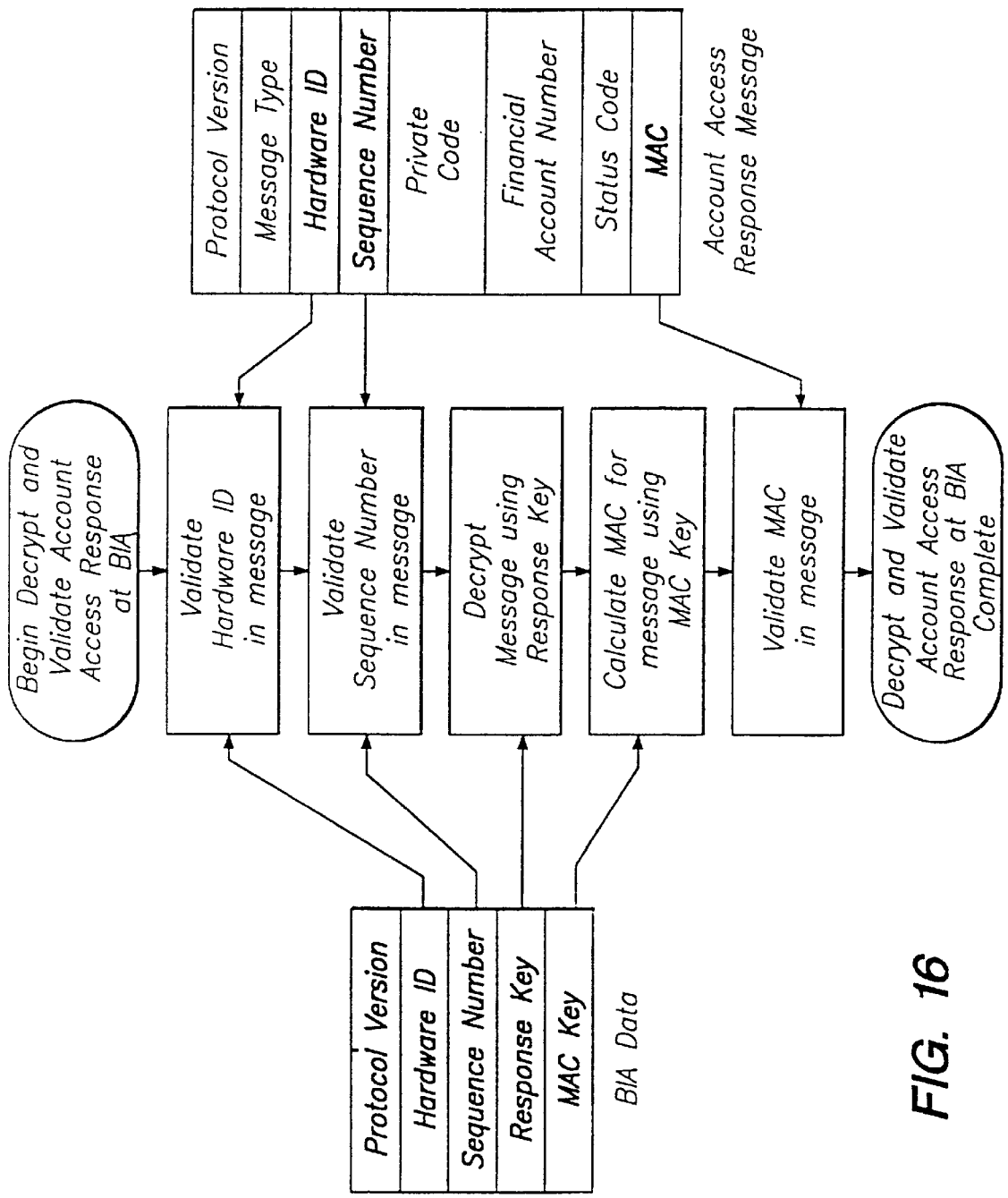
FIG. 16 is a flowchart depicting the decryption and validation of an account access response message at the BIA.

FIG. 4 is a flowchart depicting the generation of an account access request message. FIG. 5 and FIG. 6 show a representational diagram of the account access request and response messages. Furthermore, it is shown which parts of the messages are encrypted and which ones are sealed. FIG. 7 is a block diagram of the overall process for data encryption and sealing showing the use of DUKPT key data 20 for encryption of data before appending additional data before sealing the message with a Message Authentication Code (MAC) 21. FIG. 8 and FIG. 9 show the decryption and encryption processes at the DPC. FIG. 10 shows the steps taken during encryption/sealing process at the BIA until the registration of the user is complete. FIG. 11 describes the steps involved in processing an account access request from a user, starting from entry of biometric personal authentication information at the BIA, all processing by the DPC, and then finally the presentation of results by the BIA. FIG. 12 describes the user ID process at the DPC. FIG. 13 shows the silent alarm processing. FIG. 14 shows the process for the account access response message construction. FIG. 15 shows the re-registration check step for determination of fraudulent re-registration without the use of a PIN. FIG. 16 shows the decryption and validation of an account access response message at the BIA.

Description of the drawings, diagrams, flow charts and the description of the invention, including hardware components, software components, execution modules, databases, connection means, the data transferred between them, and the method of the invention is described in a preferred embodiment below.

Biometric Input Apparatus (BIA)

The BIA is a combination of hardware and software whose job is to gather, encode, and encrypt biometric input for use in electronic financial transactions and providing access to financial services. Actions of the BIA are directed by an ATM, which issues commands and receives results over the BIA's serial line. In the preferred embodiment, the BIA is an add-on component for existing ATM devices. However, in another embodiment, the BIA components are built in to the ATM at time of manufacture.

Each BIA has its unique encryption codes that are known only to the DPC, and each BIA is only allowed to perform operations limited to its designated function. Each BIA has a hardware identification code previously registered with the DPC, which makes the BIA uniquely identifiable to the DPC in each subsequent transmission from that biometric input device.

ATMs

BIAs are preferably fully integrated with the ATM. It is preferred that the BIA never disclose any secret encryption codes to any external source.

The BIA hardware is a multichip module combined preferably with a single-print scanner, a display screen, a serial port, and a key pad. The following components are preferably amalgamated into a multichip module, called the BIA Multichip Module (a process for encapsulating several processors in one physical shell, well known in the industry), constructed to protect the communications pathways between the devices from easy wiretapping; Serial processor, keypad processor, LCD screen processor, CCD, Scanner, A/D processor, High-speed DSP processor containing both flash and mask, ROM, General-purpose microprocessor, Standard RAM, and EEPROM.

The following software packages and data are preferably stored in mask ROM; MAC calculation library, DUKPT Key Management library, DES (with CBC) Encryption, library, Base-64 (8-bit to printable ASCII) converter library, Embedded Operating System, Serial line device driver, LCD device driver, key pad device driver, Scanner device driver, Unique hardware identification code, and Multi-Language profiles.

The following standard data and software packages are preferably stored in flash ROM. Flash ROM is more expensive, but it is much more difficult to reverse engineer, and most importantly, it is electronically erasable. All of the more critical information is stored here. Flash ROM is used in an attempt to increase the difficulty of duplicating a BIA.

The standard data and software packages include; Unique DUKPT Future Key Table, Unique 112-bit MAC Key, DSP biometric quality determination algorithm, DSP biometric encoding algorithm, Random number generator algorithm, and Command function table.

The message sequence number, incremented each time a message is sent from the BIA, is stored in the EEPROM. EEPROM can be erased many times, but is also nonvolatile—its contents remain valid across power interruptions The following data is stored in RAM. RAM is temporary in nature, and its contents are lost whenever power is lost; Encoded Biometric Register, Account Index Code Register, Amount Register, Message Key, Response Key, 8 General Registers, and stack and heap space.

Each multichip module contains a "write-once" memory location that is irreversibly set following the initialization of the flash ROM. Whenever an attempt is made to download software to the flash ROM, this memory location is preferably checked; if it is already been set, then the BIA refuses to load. Critical software and data keys may only be downloaded once into the device, at the time of manufacture.

All registers and keys are explicitly zeroed when an account access is canceled. Once an account access is completed, registers are cleared as well. Once a "form message" command is executed, biometric and account index code registers are also cleared, along with any encryption keys that aren't required for subsequent use. It is important that the software not keep copies of registers or keys in stack variables.

The following associated hardware components comprise the standard BIA hardware module; BIA Multichip module, CCD single-print scanner, lighted keypad with auxiliary buttons, 2-line 40-column LCD screen, RF shielding, tamper-resistant case, serial connection (up to 57.6 kb), tamper detection hardware.

All temporary storage and internal hardware and software used to calculate these values are secured, which means they resist any attempts to determine their current values, or their means of functioning.

BIA Software

Preferably, the external interface to the BIA is much like a standard modem; commands are sent to it from a controlling ATM using the external serial line. When a command completes, a response code is sent from the BIA to the ATM. All BIA data fields are preferably in printable ASCII, with fields separated by field separator control characters, and records separated by newlines. Encrypted fields are binary converted to 64-bit ASCII using the base-64 conversion library (all known in the industry).

If, instead of a financial account screen prompt, an account index code is used, this code can be one or more alphanumeric characters, which includes numbers, letters, and other characters. For foreign languages, this includes multiple-character combinations which are used to represent specific words or concepts in that language, such as kanji characters. When instructed, the BIA captures a biometric in the following way. A fingerprint image is captured and given a preliminary analysis by the print quality algorithm. If the image is not clearly readable by the biometric algorithm software, the BIA continues to take new scans until a predetermined number of seconds pass. As time passes and images of are taken and analyzed, messages are posted to the LCD screen and sent to the ATM based on the problems detected by the image quality algorithm. If no image of appropriate quality is forthcoming, the BIA returns an error code of time expired, displaying a message to that effect on the LCD.

The BIA software is supported by several different software libraries. Some of them are standard, generally available libraries, but some have special requirements in the context of the particular biometric used for identification of the user.

Since the BIA is constantly selecting random DES keys for use in the message body and message response encryption, it is important that the keys selected be unpredictable keys. If the random number generator is based on time of day, or on some other externally-predictable mechanism, then the encryption keys will be much more easily guessed by an adversary that happens to know the algorithm. The security of the encryption techniques used in the BIA assumes that both the random number generator algorithm as well as the encryption algorithms are both publicly known. One such random number algorithm for generating DES keys is defined in ANSI X9.17, appendix C.

The biometric encoding algorithm is an algorithm for locating identifying or locating the physical characteristic feature of a user of the system for example the minutiae that are formed by ridge endings and bifurcations on human fingertips. A complete list of minutiae is stored in the DPC as a reference, while only a partial list is required by the algorithm when performing a comparison between an identification candidate and a registered user.

During both registration as well as identification, the encoding algorithm must preferably find a reasonable number of minutiae points. Otherwise, the BIA will ask for the biometric to be re-entered.

The BIA is a real-time computing environment, and as such requires a real-time embedded operating system to run it. The operating system is responsible for taking interrupts from devices and scheduling tasks.

Each device driver is responsible for the interface between the operating system and the specific hardware, such as the Key pad device driver, or the CCD Scanner device driver. Hardware is the source for events such as "Key pad key pressed," or "CCD Scanner scan complete". The device driver handles such interrupts, interprets the events, and then takes action on the events.

There are any number of DES implementations publicly available. DES implementations provide a secret key-based encryption from plaintext to ciphertext, and decryption from ciphertext to plaintext, using 112-bit secret keys.

Public Key encryption support libraries are available from Public Key Partners, holders of the RSA public key patent (known in the industry). Public Key cryptosystems are asymmetric encryption systems that allow communication to take place without requiring a costly exchange of secret keys. To use a public key encryption system, a public key is used to encrypt a DES key, and then the DES key is used to encrypt a message. The BIA uses public key cryptosystems to provide for the secure exchange of secret keys.

The derived unique key per transaction key (DUKPT) management library is used to create future DES keys given an initial key and a message sequence number. Future keys are stored in a Future Key Table. Once used, a given key is cleared from the table. Initial keys are only used to generate the initial future key table. Therefore the initial key is not stored by the BIA The use of DUKPT is designed to create a key management mechanism that provided a different DES key for each transaction, without leaving behind the trace of the initial key. The implications of this are that even successful capture and dissection of a given future key table does not reveal messages that were previously sent, a very important goal when the effective lifetime of the information transmitted is decades. DUKPT is fully specified in ANSI X9.24.

ATMs

The ATM is the device that controls the BIA and connects to the DPC via modem, X.25 packet network, telephone network, or a private intranet. Whenever a ATM provides information to the system, the system always validates it in some manner, either through presentation to the user for confirmation, or by cross-checking through other previously registered information.

While ATMs are able to read some parts of BIA messages in order to validate that the data was processed properly by the BIA, ATMs cannot read biometric identification information including the biometric, encryption keys, or any account index codes.

BIAs export some security functionality to the ATM, such as private code display. The purpose of the BIA-equipped ATM is to provide users access to cash and other ATM functions without having to use a debit card. It does this by submitting a biometric, retrieving a list of accounts, and allowing the user to select a particular account on which to perform operations. For users of the system, this replaces the ATM card+PIN mechanism as a method for identifying the financial account and authorizing the user. It is assumed that all ATMs still continue to accept ATM cards.

The BIA-equipped ATM consists of:
a standard ATM
an integrated BIA
a connection to the DPC The biometric ATM uses an integrated BIA to identify users and allow them access to financial accounts using a biometric and an account index code. A BIA is installed into the ATM, making use of the ATM's current keypad and account index code entry. The ATM is connected to the system using its standard debit network connection. The BIA is structured in such a way as to make integration with an existing ATM network as simple as possible.

Three entities need to be identified for the DPC to respond properly to a BIA account request: the user, the bank, and the BIA.

The bank is identified by cross-checking the ATM's stored bank code with the BIA's bank code. The BIA is identified by successfully locating the BIA in the VAD, and the user is identified through the standard biometric.

To access an ATM, a user enters their biometric. The BIA forms a Account Access request message, which is then sent to the DPC by the ATM. The DPC validates the biometric, and then sends the resulting financial account list along with the private code back to the ATM. The ATM asks the BIA to decrypt the response, and then displays the private code on the ATM's display screen. In addition, the ATM also examines the response to see whether or not the user has caused a silent alarm to be raised during the account access.

Once the account list has been received by the ATM, the user selects an account, and performs financial operations using that and related financial accounts with the ATM, requesting cash, depositing funds, transferring funds, inquiring about account balances, and so on.

Messages between the ATM and the DPC are preferably secured by encryption and MAC calculation from the BIA. The MAC means that the ATM cannot change the contents of the message without being detected, and encryption prevents the encrypted part of the message from being disclosed.

Because the BIA has no LCD or no keypad attached, it requires the ATM to provide all the text prompts and to gather all the input from the user.

Data Processing Center

The Data Processing Center (DPC) handles user registration and user identification, as its main responsibilities.

Preferably, each DPC site is made up of a number of computers and databases connected together over a LAN as illustrated in the DPC Overview FIG. 2. Multiple identical DPC sites ensure reliable service in the face of disaster or serious hardware failure at any single DPC site. Furthermore, each DPC site has electrical power backup and multiple redundancy in all of its critical hardware and database systems.

DPC components fall into three categories: hardware, software, and databases. Below is a short description, by category, of each component.

Hardware

Firewall Machine: the entry point of the DPC site. FW

Gateway Machine: the system coordinator and message processor. GM

DPC Local Area Network: connects the DPC sites. DPCLAN

Databases

Individual Biometric Database: identifies users either from their biometric or a biometric and PIN IBD Valid Apparatus Database: stores information required to validate and decrypt BIA messages. VAD Apparatus Owner Database: stores information about the owners of BIA devices. AOD Software Message Processing Module: handles the processing of each message by coordinating with the other software modules and databases required to perform the message's task. MPM Sequence Number Module: handles DUKPT sequence number processing. SNM Message Authentication Code Module: handles MAC validation and generation. MACM Message Decrypt Module: handles encrypting and decrypting of BIA requests and responses. MDM IBD Machine List: handles the lookup of the main and backup database machines dedicated to holding IBD records for a given biometric group. IML When defining database schema, the following terminology is used for describing field types:

int<X> an integral type using <X> bytes of storage
char<X> a character array of <X> bytes
text a variable length character array
<type>[X] a length <X> array of the specified type.
time a type used for storing time and date
biometric a binary data type used for storing the biometric When describing database storage requirements, the term "expected" means the expected condition of a fully loaded system.

ATMs accomplish their tasks by sending messages to a DPC site. The DPC site sends back a response packet containing the status on the success or failure of the operation.

Communication is via a logical or a physical connection—oriented message delivery mechanism such as X.25 connections, TCP/IP connections, or a telephone call to a modem bank. Each session holds the connection to the ATM open until the DPC sends its response back to the ATM.

The message contains a BIA message part and a ATM message part:

BIA message part consists of;
    protocol version number
    message type
    4-byte BIA Identification (hardware ID)
    4-byte sequence number
    <message specific data>
    Message Authentication Code (MAC)
ATM message part
    <ATM specific data>

The BIA message part is constructed by a BIA device. It includes one or two biometrics, authorization amounts, and the contents of the general registers which are set by the ATM. Note: the MAC in the BIA message part only applies to the BIA part and not to the ATM part.

An ATM may place additional data for the message in the ATM message part. The BIA provides a message key to allow the ATM to secure the ATM part data. The BIA automatically includes the message key in the packet's encrypted biometric block when necessary. The ATM performs the message key encryption itself, however.

The response packet contains a standard header and two optional free-form message parts: one with a MAC and one without:

Standard Header
    protocol version number
    message type
    4-byte hardware ID
    4-byte sequence No.
    <message specific data>
    MAC
    Optional Free-form message part without MAC
    <additional message specific data>

The message part with a MAC is sent to the BIA so that it may validate that this part of the response has not been tampered with and to display the user's private code. The message part without a MAC is used for transmitting large amounts of data that are not sent to the BIA for MAC validation as the BIA to ATM connection may be of limited bandwidth.

In an embodiment of the invention with multiple DPC sites, a ATM need only send its message to one of the DPC sites, typically the closest, because that site automatically handles updating the others by running distributed transactions as necessary.

When one of the DPC's Firewall Machines receives a packet, it forwards it to one of the GM Machines for the actual processing. Each GM has a Message Processing Module that handles the coordination between the DPC components required to process the message and sends the response back to the sender.

All packets the DPC receives, with the exception of those not constructed by a BIA, contain a BIA hardware identification code (the BIA Identification of the packet), a sequence number, and a Message Authentication Code (MAC). The GM asks the MAC Module to validate the packet's MAC and then checks the sequence number with the Sequence Number Module. If both check out, the GM passes the packet to the Message Decrypt Module for decryption. If any one of the checks fail, the GM logs a warning, terminates processing for the packet, and returns an error message to the BIA device.

Each packet the DPC receives may contain an optional response key stored in the encrypted biometric block of the packet. Before the DPC replies to a message that includes a response key, it encrypts the response packet with the response key. It also generates a Message Authentication Code and appends it to the packet.

The only exception to encrypting response packets applies to error messages. Errors are never encrypted and never include confidential information. However, most response packets include a status or response code that can indicate whether the request succeeded or not.

DPC Procedures

The DPC has three procedures commonly used while processing messages.

For messages that require the DPC to identify a user, the DPC executes the following procedure. Using the bid biometric, the DPC searches the IBD Machine List for the main and backup IBD machines responsible for handling identifications for the given biometric. Next, the DPC sends the identification message to either the main or backup machines depending on which is the least loaded. The IBD machine responds with the IBD record for the user or a "user not found" error.

The IBD machine retrieves all the IBD records for the given biometric. The IBD machine compares each record's primary registered biometric sample with the user's bid biometric sample arriving at a comparison score indicating the similarity of the two biometrics. If no biometric has a close enough comparison score, the comparisons are repeated using the registered secondary biometric samples. If none of the secondary biometric have a close enough comparison score, then the IBD machine returns an "user not found" error. Otherwise, the IBD machine returns the full IBD record of the user, from which such fields such as the private code, financial account numbers, and so on may be obtained.

In one embodiment, other information is present that assists the IBD machine in searching the database. For finger images, this includes information such as the classification of the image (whirl, arch, etc.), and other information about the finger ridge structure that is useful for selecting out biometrics that are not likely to match (or information on biometrics that are likely to match). Other methods of obtaining grouping or searching information from biometric template information are known in the industry.

Each entry in the VAD preferably has information on the number of recent messages submitted, the number of recent messages that have failed, the device security assessment, whether or not the device is attended along with the fraud detection skill of the attendant, and lastly the security problems associated with the physical location of the device itself.

Whenever a user identification fails, the VAD record for the device is updated appropriately. Too many failures, and the Security Factor Module will take the device out of service, refusing any further transactions from that device until a service representative places it back in service.

Protocol Messages

The following sections describe each protocol message/response and the actions the DPC takes to perform them.

The list of protocol packets are:

User Registration

User Identification

Electronic Financial Transaction

ATM Access

Account Access

User Registration

Registration Request

---

BIA Part:
    protocol version message type
    4-byte hardware ID
    4-byte sequence number
    encrypted(DUKPT key) Biometric:
        1000-byte primary registration biometric
        1000-byte secondary registration biometric
        112-bit response key
        112-bit message key
    MAC
ATM Part:
    encrypted(message key):
        name
        address
        zipcode
        private code
        financial account list (account index code, financial account #)
        account index code

---

Registration Response

--- protocol version
message type
4-byte hardware ID

-continued

```
4-byte sequence number
encrypted(response key):
    private code text
    biometric identification code
    list of DPC chosen biometrics
status code (OK, fail, etc.)
MAC
```

Users register with the DPC via a User Registration ATM (URT). The URT sends the DPC a registration packet containing primary and secondary biometrics, along with ancillary data such as the user's name, address, a list of financial accounts, the private code, and the emergency account index code. Optionally, the user may include a Social Security Number (or "SSN"). In a modification step any previously entered data can be modified or deleted.

Preferably, only one DPC site acts as the registration site, for implementation simplicity. Registration request packets received by non-registration DPC sites are forwarded to the current registration site. The registration DPC site performs the entire registration check, assigning of IBD records to IBD machines, and the distributed transaction required to update all other DPC sites.

The registration DPC site selects the biometric for the registration biometric, stores the IBD record on the main and backup IBD machines (as specified in the biometric List), and checks the biometric suitability of the registration packet before running the distributed transaction to update the other DPC sites.

The DPC runs a biometric sample duplication check step wherein the biometric from the registration step is checked against all previously registered biometrics currently associated with the identical biometric. The DPC may reject the registration for the following reasons: the biometrics are confusingly similar to another biometric. Alternatively, the biometrics may be too similar to other biometrics stored, resulting in an unacceptable false accept rate or false reject rate.

User Identification

User Identification Message

```
BIA Part:
    4-byte BIA Identification
    4-byte sequence number
    encrypted(DUKPT key) Biometric block:
        300-byte authorization
        112-bit response key
    MAC
ATM Part: (not used)
```

User Identification Response

```
encrypted(response key):
    private code text
    user name
status code (ok, failed, etc.)
MAC
```

The User Identification message includes a biometric block which the DPC uses with the user identification procedure to identify the user. If the user is identified, then the DPC responds with the user's name, biometric identification, and private code. Otherwise, the DPC responds with an "unknown user" error.

Account Access

Account Access Request Message

```
BIA Part:
    4-byte BIA Identification
    4-byte sequence number
    encrypted(DUKPT key) Biometric block:
        300-byte authorization biometric
        112-bit response key
    MAC
ATM Part: (not used)
```

Account Access Response

```
encrypted(response key):
    private code text
    list of(account name, account numbers)
status code (OK, failed, etc.)
MAC
```

The Account Access message allows users to retrieve the list of financial accounts linked to the user's biometric. The ATM uses this list to determine which accounts the user has permission to perform operations upon.

The GM identifies the user by the packet's biometric and retrieves the appropriate information from the user's record.

User Support and System Administration Messakes

The DPC handles additional message types classified as internal messages. The DPC generally does not accept these messages from non-DPC systems. The messages are database vendor specific. However, the internal network uses DES-encrypted packets to provide additional security.

The User Service and System Administration tasks are implemented using the database vendor's query language and application development tools.

User Service tasks

IBD: find, activate, deactivate, remove, correct records, change biometric.

AID: add or remove authorized individuals.

AOD: find, add, remove, correct records.

VAD: find, activate, deactivate, remove, correct records.

PFD: add, remove, correct records.

System Administration tasks

Run prior fraud checks.

Modify the Valid Site List.

Summarize log information (warnings, errors, etc.).

Performance monitoring.

Run backups.

Crash recovery procedures.

Time synchronization for the DPC sites.

Change the primary registration site.

Change the secret DES encryption key.

Generate a list of BIA hardware identification code, MAC encryption key, and DUKPT Base Key triples. Store on an encrypted floppy for the Key Loading Device.

DPC LAN

The DPC Local Area Network (LAN) links the machines of the DPC sites together preferably using a fiber optic token ring. The fiber optic token ring provides both high bandwidth and good physical security.

The network interfaces used by the machines on the DPC LAN include encryption hardware to make tapping or intercepting packets useless without the encryption key. The encryption key is the same for all machines on the LAN and is stored in the encryption hardware.

A properly configured network sniffer acts as an intruder detector as backup for the FW. If an anomalous message is detected, the intruding messages are recorded in their entirety, an operator is alerted, and the FW is physically shut down by the sniffer.

Message Processing Module

The Message Processing Module (MPM) handles the processing for a message. It communicates with other components of the DPC as necessary to perform its tasks. The presence of an MPM on a machine brands it as a GM.

The MPM maintains a message context for each message it is currently processing. The message context includes the information necessary to maintain the network connection to the ATM making the message, the BIA device information, the response key, and the response packet.

Message Authentication Code Module

The Message Authentication Code Module's (MACM) tasks are to validate the Message Authentication Code on inbound packets and to add a Message Authentication Code to outbound packets.

The MACM maintains an in-memory hash table of 112-bit MAC encryption keys keyed by BIA hardware identification code.

When the MACM receives a request from the GM to validate a packet's MAC, it first looks up the packet's hardware identification code in the hash table. If no entry exists, then the MACM replies to the GM with an "invalid hardware identification code" error.

Otherwise, the MACM performs a MAC check on the BIA message part of the packet using the 112-bit MAC encryption key. If the MAC check fails, then the MACM replies to the GM with an "invalid MAC" error. Otherwise, the MACM replies with a "valid MAC" message.

If the packet contains a seller identification code, the MACM also checks the seller identification code against the owner identification code in the hash table. If the codes don't match, then the MACM replies with an "invalid owner" error.

When the MACM receives a request from the GM to generate a MAC for a packet, it looks up the MAC encryption key using the packet's hardware identification code. With the MAC encryption key, the MACM generates a MAC and adds it to the packet. If the MACM cannot find the hardware identification code in its hash table, it replies with an invalid hardware identification code error instead.

Database Schema

The MACM hash table entry contains:

MACM Entry:
  hardwareId=int4
  ownerId=int4
  macEncryptionKey=int16

The table is hashed by hardware identification code.

The MACM only contains records referencing active BIA hardware identification codes and active apparatus owners. Whenever an apparatus or apparatus owner is suspended or deleted from the system, the MACM removes any entries that reference the identification code. When an apparatus is activated, the MACM then adds an entry for it.

The MACM also caches the MAC encryption key from the Valid Apparatus Database. Since the system does not allow the encryption key of a BIA to be changed, the MACM does not need to worry about receiving encryption key updates.

Message Decrypt Module

The Message Decrypt Module's (MDM) task is to reconstruct the DUKPT transaction key and with it decrypt the biometric block of the packet. It maintains a list of the DUKPT Base Keys that are required to generate the transaction key.

The MDM constructs the DUKPT transaction key using the packet's sequence number as the DUKPT transaction counter, the upper 22 bits of the BIA hardware identification code as the DUKPT tamper resistant security module (or "TRSM") Identification, and the low 10 bits of the BIA hardware identification code as the DUKPT Key Set Identification.

The DUKPT standard specifies how the transaction key is generated. The Key Set Identification is used to look up a Base Key from the Base Key List. The Base Key is used to transform the TRSM Identification into the initial key via a DES encrypt/decrypt/encrypt cycle. The transaction counter is then applied to the initial key as a series of DES encrypt/decrypt/encrypt cycles to generate the transaction key.

For additional security, two Base Key Lists are maintained, one for low security BIA devices and one for high security devices. The MDM chooses which Base Key List to use depending on the security level of the device.

Database Schema

The MDM Base Key List entry contains:

MDM Entry:
  baseKey=int16

The Base Key List is indexed by Key Set Identification.

The MDM maintains an in-memory list of the DUKPT Base Keys. Each key requires 112-bits. The MDM maintains two sets of 1024 keys requiring 32 KB total.

Biometric Group List BGL)

The Biometric Group List (BGL), in conjunction with the Individual Biometric Database Machine List, defines the configuration of the IBD machines. A BGL exists on each GM Machine (GM).

The BGL maintains the list of groups in order and uses a binary search to quickly find the correct group.

The initial configuration for the BGL, is one giant biometric group containing all possible biometrics. After a threshold number of biometrics are assigned, the giant biometric group is split in two. Thereafter, this process is applied to all succeeding biometric groups.

When a biometric group splits, the BGL assigns a new main and backup IBD machine based on available storage on a first-come-first serve basis. The BGL coordinates with the IBD machines to first copy the affected records from the old main and backup machines to the new ones, update the IML record, and last remove the old main and backup copies. Splitting a biometric group is an involved task. The BGL batches split requests to be run when the DPC is lightly loaded, for instance, at night.

The system administrator may also change the main and backup IBD machines for a given biometric group if the machines' free storage falls below a level required for handling the expected amount of new registrations.

Database Schema

The schema for the Biometric Group records are:

BiometricGroup:
  lowBgv=int8
  highBgv=int8
  used=int4

Each biometric group is identified by a unique identifier. For convenience the biometric group identification code is the lowBgv code for the group, however the system does not otherwise rely upon this fact.

The BGL is keyed by the lowBgv field.

The BGL is expected to contain about 3000 groups (each biometric group contains about 1000 active biometric values, but may span millions of actual biometric values). The entire BGL requires about 72 KB of storage and is cached completely in memory.

When biometric groups are added, merged, or split up, the BGL is responsible for informing the IBD Machine List of the changes and for directing the movement of IBD records from one IBD machine to another.

Individual Biometric Database Machine List

The IBD Machine List (IML), in conjunction with the Biometric Group List, codifies the configuration of the IBD machines. The IML maps a biometric value to the main and backup IBD machines storing IBD records for the biometric. The IML is actually keyed by Biometric Group (a set of consecutive biometric values). An IML exists on each GM Machine (GM).

When a GM processes a message that requires a biometric identification, the GM finds the IML record keyed by the biometric group. The GM then knows the main and backup IBD machines to use for the biometric identification.

Most IBD records will be users, who will use the system to purchase products from sellers at points of sale. The rest of the records will be generally associated with people who perform administrative functions such as registration, or user support.

Database Schema

The schema for the IML list entries are:

MachinePair:
  biometricGroup=int8
  main=int2,
  backup=int2

The IML is keyed by bvgGroup.

The IML is expected to contain about 3000 entries (the number of Biometric Value Groups). Each MachinePair record is 12 bytes requiring about 36 KB of storage and is cached completely in memory.

Any changes in the configuration of the IBD machines are reflected in the IML. In addition, the IML uses Biometric groups for its keys so when the Biometric Group List gets modified, the IML is also updated.

Sequence Number Module

The Sequence Number Module's (SNM) primary function is to prevent replay attacks by validating packet sequence numbers. Its secondary task is to minimize the effects of a resubmission attack by informing other SNMs in remote DPC sites of sequence number updates and to periodically update the sequence numbers in the Valid Apparatus Database.

The SNM maintains an in-memory hash table of sequence numbers keyed by BIA hardware identification code codes to allow quick validation of packet sequence numbers.

When the SNM receives a validate request from the GM for a given hardware identification code and sequence number, it looks up the hardware identification code in the hash table. If no entry exists, then the SNM replies to the GM with an "invalid hardware identification code" error.

Otherwise, the SNM checks the given sequence number against the sequence number stored in the hash table entry. If the sequence number is less than or equal to the stored sequence number, the SNM replies with an "invalid sequence number" error. Otherwise, the SNM sets the sequence number in the hash table entry to the given sequence number and replies with a "valid sequence number" message.

From time to time, the SNM may observe a sequence number gap. A sequence number gap occurs when the SNM receives a sequence number that is more than one greater than the sequence number stored in the hash table entry. In other words, a sequence number was skipped. When the SNM discovers a sequence number gap, it replies with a "sequence number gap" message to the GM instead of a "valid sequence number" message. The GM treats the packet as valid, but it also logs a "sequence number gap" warning.

Sequence number gaps usually occur when network connectivity is lost: packets are dropped or can't be sent until the network is restored to working order. However, sequence number gaps occur for fraudulent reasons as well: malicious parties could intercept packets preventing them from arriving at the DPC or they could even attempt to counterfeit packets (with a large sequence number so that it isn't immediately rejected).

The SNM's secondary function is to inform other DPCs of the updated sequence numbers. Quickly updating sequence numbers at all DPC sites thwarts resubmission attacks wherein a malicious entity monitors packets destined for one DPC site and immediately sends a copy to a different DPC site in the hope of exploiting the transmission delay of sequence number updates from one DPC site to another resulting in both sites accepting the packet as valid, when only the first site should accept the packet.

The SNMs send update messages to each other whenever they receive a valid sequence number. If an SNM receives an update message for a sequence number that is less than or equal to the sequence number currently stored in its hash table, that SNM logs a sequence number resubmission warning. All resubmission attacks are detected in this manner.

A simpler way to thwart resubmission attacks completely, is to have only one SNM validate packets. Under this scheme, there is no update transmission delay window to exploit with a resubmission attack. Alternately, multiple SNMs can be active at the same time provided none of them handle sequence number validation for the same BIA-equipped device.

Sequence Number Maintenance

When the SNM boots up, it loads the sequence number hash table from the sequence numbers for active BIA stored in the VAD.

The VAD is responsible for sending add-entry and remove-entry messages to the SNMs for any BIA-equipped devices that are activated or deactivated to keep the SNM hash table up-to-date.

Database Schema

The SNM hash table entry contains:

SNM Entry:
  hardwareId=int4
  sequenceNumber=int4

The hash table is keyed by hardwareId.

Assuming about 5 million BIA-equipped devices in service requires the hash table to be about 40 MB.

The SNM depends on the Valid Apparatus Database. When an apparatus is suspended or removed from the database, the SNM removes the corresponding entry. When an apparatus is activated, the SNM creates an entry for it.

The SNMs require a transmission bandwidth of about 8 KB per second to handle 1000 update sequence number messages per second. The update sequence number messages is buffered and sent out once per second to minimize the number of actual messages sent.

Apparatus Owner Database

The Apparatus Owner Database (AOD) stores information on users or organizations that own one or more BIA-equipped devices. This information is used to double check that the BIA devices are used only by their rightful owners, to provide financial account information, and to allow identification of all BIAs owned by a specific user or organization.

Database Schema

The schema for the Apparatus Owner record is:

ApparatusOwner:
   ownerId=int4
   name=char50
   address=char50
   zipCode=char9
   status=int1

The status field is one of:
   0: suspended
   1: active

The Apparatus Owner Database is keyed by ownerId.

The AOD is stored as a hashed file keyed by owner identification code. A copy of the AOD is stored on each GM.

When entries are removed or suspended from the AOD, any Valid Apparatus Database records that reference those apparatus owners are marked as suspended. In addition, the MAC Module and the Sequence Number Module remove their entries for the suspended apparatuses.

Valid Apparatus Database

The Valid Apparatus Database (VAD) is a collection of records representing all of the BIAs that have been manufactured to date. The VAD record contains the Message Authentication Code encryption key for each BIA, as well as an indication of whether a BIA is active, awaiting shipment, or marked as destroyed. In order for a message from a BIA to be decrypted, the BIA must exist and have an active record in the VAD.

When manufactured, each BIA has a unique public identification code. In addition, each BIA is injected with a unique MAC encryption key, and an initial DUKPT key, all of which are entered into the VAD record prior to BIA deployment.

When a BIA is first constructed, it is given a unique hardware identification code. When a BIA is placed in service, its hardware identification code is registered with the system. First, the owner or responsible party of the BIA is entered into the Apparatus Owner Database (AOD). Then, the VAD record is pointed to the AOD record, and the BIA is then set active. Messages from that BIA are accepted by the DPC.

When a BIA enters service, the installing agent performs an attendant security assessment, determining the relative attentiveness the organization pays towards fraud-fighting and the like. Likewise, the geography of the surrounding area is examined; high crime neighborhoods will merit a lower security value, for instance. These values are place in the VAD record for the device. These can change over time.

When a BIA is removed from service, it is marked as inactive, and the link to the AOD record is broken. No communications from that BIA are accepted.

Each BIA type and model has a device security assessment performed on it during its design and construction. This represents the basic ability of the device to resist attempts to monitor the BIA's internal functioning, the ability of the BIA to keep both past and current encryption keys stored on the BIA secret, and the BIA's ability to resist reprogramming by criminals.

The number of failed messages, recent messages, and the average number of messages performed by a given apparatus are recorded in the VAD record, to assist the security factors module in detecting fraudulent messages. Periodically, the recentReqs and the failedReqs fields are cleared.

Database Schema

The schema for the Valid Apparatus record is:

Valid Apparatus:
   hardwareId=int4
   macEncryptionKey=int16
   ownerId=int8
   mfgDate=time
   inServiceDate=time
   deviceSecurity=int2
   locationSecurity=int2
   attendentSkill=int2
   failedReqs=int2
   recentReqs=int2
   avgReqs=int2
   status=int1

Possible values for the status field are:
   0: suspended
   1: active
   2: destroyed The Valid Apparatus Database is keyed by the hardware identification code.

The VAD is stored as a hashed file keyed by hardware identification code. A copy of the VAD is stored on each GM.

When a VAD record changes status, the MAC Modules and Sequence Number Modules are informed of its change in status. For instance, when an apparatus becomes active, the MACP and SNM adds an entry for the newly active apparatus. When an apparatus becomes inactive, the MACP and SNM remove their entry for the apparatus.

Individual Biometric Database

Individual Biometric Database (IBD) records store personal information on users for both identification as well as authentication. This information may include their primary and secondary biometrics, one or more biometric values, a list of financial accounts, perhaps an account index code, account index names, private code, one or more emergency account index codes, address, and phone number. The user may optionally include this SSN. This information is necessary for identifying a user either by biometric or personal information, for accessing related information, or for providing an address or phone number to remote sellers or banks for additional verification.

Users are added to the system during the user enrollment process at registered User Registration ATMs located in retail banking establishments worldwide, or in local system offices. During enrollment, users add financial accounts and optionally any personal identification numbers, to their biometrics.

The IBD exists on multiple machines, each of which is responsible for a subset of the IBD records with a copy of each record stored on two different machines, both for redundancy and for load-sharing. The IBD Machine List, stored on the GM, maintains which machines hold which biometric values.

Database Schema

The schema for the User Biometric record is:

UserBiometric:
   primaryBiometric=biometric
   secondaryBiometric=biometric
   biometricId=int4
   phoneNumber=char12
   lastName=char24
   firstName=char24
   middleInitial=char2
   SSN=char9
   privateCode=char40

```
address=char50
zipCode=char9
publicKey=char64
checksums=int4[10]
accountIndexCodes=char30[10]
accountIndexNames=char30[10]
emergencyIndexCode=char1
emergencyLink=char1
privs=char10
enroller=int8
silentAlarmCount=int4
silentAlarmBehavior=int2
status=int1
```

The status field is one of:
  0: suspended
  1: active
  2: priorFraud

The IBD is keyed by the biometric value.

Each IBD machine, preferably, has additional indexes on the user's Social Security Number, last name, first name, and phone number to facilitate access to the IBD database.

Each IBD machine has 40 GB of secondary storage provided by one or more RAID devices. Each IBD record is 2658 bytes (assuming the biometrics are 1K apiece) allowing up to 15 million records per machine. The IBD records are stored using a (sometimes clustered) secondary index on the biometric value. The index is stored in memory and requires no more than 64 MB (a 64 MB index handles about 16 million entries). To store records for 300 million users, the DPC needs at least 40 IBD machines: 20 IBD machines for main storage and another 20 for backup. The number of IBD machines is easily scaled up or down depending on the number of registered users.

The IBD machines, Biometric Group List, and the IBD Machine List remain up-to-date in terms of which biometric values are on which machine. When a biometric group is reconfigured or main and backup machines for biometric groups are changed, the IBD machines update their databases and indexes appropriately.

Authorized Individual Database

For each issuer or personal BIA-equipped device, the Authorized Individual Database (AID) maintains a list of users who are authorized, by the owner of the device, to use it.

The AID exists because it provides restricted access to a ATM.

Database Schema

The schema for the Authorized Individual record is:
  Authorized Individual:
    hardwareId=int4
    biometricId=int4

The hardwareId refers to a record in the Valid Apparatus Database and the biometricId refers to a record in the Individual Biometric Database. Whenever the DPC needs to check whether an individual is authorized to use a personal or issuer BIA device, the DPC checks for the existence of an Authorized Individual record with the correct hardwareId and biometricId.

Personal BIA devices are identified by a use field set to 1 (personal) in the Valid Apparatus Database. Issuer BIA devices are identified by a use field set to 2 (issuer) in the Valid Apparatus Database.

System Performance

In GM:
  1. MACM checks the MAC (local)
  2. SNM checks the sequence number (network message)
  3. MDM decrypts the biometric block (local)
  4. Find IBD machine (local)
  5. Send identify message to the IBD machine (network message)

In IBD machine:
  6. Retrieve all IBD records for the Biometric Value (x seeks and x reads, where x is the number of pages required to store the biometric records).
  7. For each record, compare against its primary biometric (y/2 ms where y is the number of records retrieved).
  8. If no reasonable match, repeat step 9 but compare against the secondary biometric ($z*y/2$ ms, where y is the number of records retrieved and z is the probability no match is found).
  9. Update the best matching IBD record's checksum queue and check for possible replay attacks (1 seek, 1 read, and 1 write).
  10. Return the best matching IBD record or an error if the match is not close enough (network message).

In GM:
  11. Authorize message with an external processor (network message)
  12. GM encrypts and MACs the response (local).
  13. Sends response packet back (network message).

Use-Sensitive DPC Procedures

In another embodiment, the system has use-sensitive data processing capabilities, wherein frequent users of the system are on a local cache. This system comprises a master DPC having a master DPC comparison engine, also referred to as a comparator. The master DPC comparator further has a master user biometric database which contains or stores the biometric samples of all users registered with the identification computer system. The master DPC further comprises a user biometric group database which contains the biometrics of said users. Biometrics of users may not necessarily be unique to the individual users, thus, more than one user can have the same biometric. The system further comprises at least two local DPCs which are physically apart from each other. Each local DPC further comprises a local comparator and a local user biometric database containing a subset of the biometric samples contained in the master biometric database. Data communications lines allows messages to flow between each local DPC and the master DPC.

To perform an identification, the BIA sends the appropriate message to the local DPC, where the comparator compares the bid biometric sample against the subset of the registered biometric samples contained in the local DPC databases to produce either a failed or successful first identification result. If the local DPC returns a failed identification result, the bid biometric sample is transmitted to the master DPC for comparison of the entered bid biometric sample to the biometric samples stored in the master DPC for producing either a failed or successful second identification result. If both identifications fail, the person is not identified. Otherwise, the result of the first or second identification result is externalized from the identification computer system to the user by the BIA and/or ATM.

If the local DPC could not identify the individual, but the master DPC could, the master DPC transmits the database record of the identified user to the local DPC. Therefore, in future bid biometric samples presented by the same individual, the local DPC will be able to identify the user without involving the master DPC.

n another embodiment of the invention the identification computer system further comprises a purge engine for deleting database records from the local DPC databases. In order to store only records for those individuals who use the system often and prevent the overload of databases with records from individuals who do not use the system often or use the local DPCs sparsely, the record of a user is deleted from the local DPC biometric databases if there has been no attempt to identify an individual upon expiration of a predetermined time limit.

In order to make communications between the master DPC and the local DPCs more safe, the system further comprises encryption and decryption means, wherein communications between the master DPC and local DPC are encrypted.

The master DPC is responsible for storage of the entire set of biometric samples registered with the computer system. Each master DPC is preferably made up of a number of computers and databases connected together over a LAN (known in the industry) as illustrated in the master DPC overview FIG. 2. Multiple identical master DPC sites ensure reliable service in the face of disaster or serious hardware failure at any single Master DPC site. Furthermore, each master, intermediary, and local DPC site has electrical power backup and multiple redundancy in all of its critical hardware and database systems.

It is preferred that the master and intermediary DPCs have a firewall machine which is the entry point of data and messages into these computers, and a gateway machine which is a system coordinator and message processor.

Firewall Machine

The FW Machines provide a first line of defense against network viruses and computer hackers. All communication links into or out of the DPC site first pass through a secure FW Machine.

The FW Machine, an Internet-localnet router, only handles messages destined for the GM Machines. BIA-equipped ATMs send packets to a single DPC site via modem, X.25, or other communication medium. The DPC relies on a third party to supply the modem banks required to handle the volume of calls and feed the data onto the DPC backbone.

For DPC to DPC communication, primarily for distributed transactions and sequence number updates, the FW Machines send out double-length DES encrypted packets. The DPC LAN component handles the encryption and decryption: the FWs do not have the ability to decrypt the packets.

A properly configured network sniffer acts as an intruder detector as backup for the FW. If an anomalous message is detected, the intruding messages are recorded in their entirety, an operator is alerted, and the FW is physically shut down by the sniffer. The FW disallows any transmissions from the internal network to the rest of the Internet.

An electronic financial transaction message requires about 400 bytes and registration packets require about 2 KB. To handle 1000 electronic financial transactions per second and 1 registration packet per second, the FW Machines are able to process about 400 KB per second. Each DPC site requires an aggregate bandwidth of nearly three T1 connections to the third party modem bank and the other DPC sites.

Gateway Machine

The GM Machine (GM), through the FW Machines, link the outside world (BIA-equipped ATMs and other DPCs) to the internal components of the DPC. The DPC has multiple GMs, typically two.

The GM supervises the processing of each BIA message, communicates with the various DPC components as necessary, and sends the encrypted results of the message back to the sender. The software performing this task is called the Message Processing Module.

The GM logs all messages it receives and any warnings from components it communicates with. For example, the GM logs any silent alarms, sequence number gaps, and invalid packets.

Processing a message may require the GM to inform GMs at all other DPCs of a change in the DPC databases. When this happens, the GM runs a distributed transaction to update the remote databases.

Distributed transactions fall into two categories: synchronous and asynchronous. Synchronous distributed transactions require the GM to wait for the distributed transaction to commit before continuing to process the packet. Asynchronous distributed transactions do not require the GM to wait for the commit, and allow it to finish processing the message regardless of whether the distributed transaction commits or not. Asynchronous distributed transactions are only used to update data for which database consistency is not an absolute requirement: sequence numbers and biometric checksum recordings may be performed asynchronously, whereas creating database records, such as User Biometric records, may not.

When executing a synchronous distributed transaction, the requesting GM only considers the entire transaction successful if all sites can successfully commit the transaction locally. Otherwise, the GMs back out the changes locally and reject the request due to a transaction error.

The list of valid DPC sites is normally all of the sites. In the case of an extreme site failure, however, a system administrator may manually remove that site from the valid site list. The most likely cause of distributed transaction failures, however, are temporary network failures that are unrelated to any DPC equipment. Messages that require a synchronous distributed transaction cannot be performed until network connectivity is restored or the site is removed from the valid site list. Before a site can be added back to the valid site list, the system administrator brings the site's databases up to date with those of a currently active site.

Software Components

Each GM runs the following software components locally for performance reasons:

Message Processing Module

Message Authentication Code Module

Message Decrypt Module

Individual Biometric Database Machine List

The message bandwidth required by the GMs is similar to that required by the FW Machines. A FDDI network interface provides 100 MBits per second and easily covers any bandwidth requirements.

From the foregoing, it will be appreciated how the objects and features of the invention are met.

First, the invention provides a computer identification system that eliminates the need for a user to possess and present a physical object, such as a token, in order to authorize a transaction.

Second, the invention provides a computer identification system that is capable of verifying a user's identity, as opposed to verifying possession of proprietary objects and information.

Third, the invention verifies the user's identity based upon one or more unique characteristics physically personal to the user.

Fourth, the invention provides an identification system that is practical, convenient, and easy use.

Fifth, the invention provides a system of secured access to a computer system that is highly resistant to fraudulent transaction authorization attempts by non-authorized users.

Sixth, the invention provides a computer identification system that enables a user to notify authorities that a particular access request is being coerced by a third party without giving notice to the third party of the notification.

Although the invention has been described with respect to a particular tokenless identification system and method for its use, it will be appreciated that various modifications of the apparatus and method are possible without departing from the invention, which is defined by the claims set forth below.

What is claimed is:

1. A computer implemented method for tokenless biometric access to financial accounts at an institution using an automated teller machine, the method comprising the steps of:
   a. a user registration step, wherein a user registers with an electronic identicator one or more registration biometric samples and one or more user financial accounts;
   b. an initiation step, wherein the user initiates an account access at an automated teller machine by submitting at least one bid biometric sample directly from the user's person, wherein no portable man-made memory devices such as smartcards or swipe cards are used by the user;
   c. at least one transmission step, wherein an account access request message comprising the user's bid biometric is forwarded from the automated teller machine to the electronic identicator;
   d. a user identification step, wherein the electronic identicator compares the bid biometric sample in the account access request message with a registration biometric sample, to produce either a successful or failed identification of the user;
   e. an account retrieval step, wherein upon successful identification of the user, at least one financial account of the user is retrieved; and
   f. an access step, wherein after successful identification of the user and successful financial account retrieval, the user is allowed to access the user financial account.

2. The method of claim 1 wherein the user registration step further comprises registering a user personal identification number with the electronic identicator, used by the electronic identicator to identify the user.

3. The method of claim 1 further comprising a financial operation step, wherein the user performs at least one action selected from the group comprising: withdrawing cash, depositing funds, transferring funds between accounts, obtaining account balances, purchasing products, paying bills, and obtaining electronic cash.

4. The method of claim 1 further comprising an electronic identicator authentication step wherein a private code, distinct from a PIN and not used to gain access to the electronic identicator, is gathered from the user during the user registration step and is presented to only the user during a presentation step, whereby the user is assured that the authentic electronic identicator was used to process the account access because a false electronic identicator would not be able to present the user's private code.

5. The method of claim 1 further comprising a user account retrieval step, wherein:
   a. the user registration step further comprises assigning an account index code to a user financial account;
   b. an account specification step, wherein the user enters an account index code;
   c. the transmission step further comprises including the account index code in the account access request message; and
   d. an account retrieval step further comprises the electronic identicator retrieving the user financial account number using the account index code from the account access request message.

6. The method of claim 5 wherein the account index code comprises an alphanumeric code.

7. The method of claim 5 further comprising an account name display step, wherein a list of accounts with their account index codes is retrieved and displayed to the user after a successful identification.

8. The method of claim 5 wherein during the user registration step, the user registers an emergency account index code, which if entered by the user during the initiation step in place of the account index code, triggers a silent alarm, whereby authorities are notified of a coerced account access.

9. The method of claim 8 wherein during the registration step, the user specifies any combination of actions taken upon the triggering of the silent alarm, comprising artificial financial resource limits, presentation of a false private code, rejection of the account access, dispensing marked bills, notifying the authorities, or the sending of the silent alarm to the institution.

10. The method of claim 1 wherein the user registers an emergency index during the registration step which, if entered by the user during the initiation step, triggers a silent alarm.

11. The method of claim 1 wherein the automated teller machine is remote from the institution and communicates with the institution using a computer network.

12. The method of claim 11 wherein the computer network is one or more of the group comprising an automated teller machine network, the Internet, a private intranet, a telephone network, or a cable TV network.

13. The method of claim 1 wherein the user registration step further comprises comparing the user's registration biometric samples to previously designated biometric samples of certain users wherein if a match occurs, the user is determined to have re-registered, whereby users who have perpetrated fraud on the system can be automatically identified from their biometrics alone when they re-register.

14. The method of claim 13 wherein the registration step further comprises collecting the biometric samples from a specific finger, whereby the system can detect re-registrations of previously designated biometric samples of certain users.

15. The method of claim 1 wherein the biometric sample is selected from any of the set of: a fingerprint, a retinal image, an iris image, a facial scan and a voice print.

16. The method of claim 1 further comprising a biometric theft resolution step, wherein a biometric sorting number of the user is changed to prevent unauthorized access by individuals who have obtained the user's personal authentication information.

17. The method of claim 1 wherein the automated teller machine comprises an application executing on a personal computer.

18. A computer implemented method for tokenless biometric access to financial accounts in institutions using an automated teller machine, and selecting from among different financial accounts, the method comprising the steps of:
   a. a user registration step, wherein a user registers with an electronic identicator one or more registration biometric samples, one or more user financial accounts, and assigns an account index code to a user financial account;
   b. an initiation step, wherein the user initiates an account access at an automated teller machine by entering at least one bid biometric sample directly from the user's person, wherein no portable man-made memory devices such as smartcards or swipe cards are used by the user;

c. an account specification step, wherein the user enters an account index code;
d. at least one transmission step, wherein an account access request message comprising the bid biometric data and the account index code is forwarded from the automated teller machine to the electronic identicator;
e. a user identification step, wherein the electronic identicator compares the bid biometric data in the account access request message with the registration biometric samples to produce either a successful or failed identification of the user;
f. an account retrieval step, wherein upon successful identification of the user, a financial account number of the user is retrieved using the account index code from the account access request message; and
g. an access step, wherein after successful identification of the user and successful financial account number retrieval, the user is allowed to access the user financial account.

19. The method of claim 18 wherein the user registration step further comprises registering a user personal identification number with the electronic identicator, used by the electronic identicator to identify the user.

20. The method of claim 18 further comprising an electronic identicator authentication step wherein a private code, distinct from a PIN and not used to gain access to the electronic identicator, is gathered from the user during the user registration step and is presented to only the user during a presentation step, whereby the user is assured that the authentic electronic identicator was used to process the account access because a false electronic identicator would not be able to present the user's private code.

21. The method of claim 18 wherein the account index code comprises an alphanumeric code.

22. A computerized device for tokenless biometric access to financial accounts at an institution using an automated teller machine, the device comprising:
a. an electronic identicator for comparing the bid and registration biometric samples of a user, wherein the electronic identicator compares the bid biometric sample in an account access request message with a registration biometric sample, to produce either a successful or failed identification of the user;
b. a biometric input apparatus for submission of the user's biometric samples to the electronic identicator;
c. at least one financial account;
d. an account retrieval module, wherein upon successful identification of the user, at least one financial account of the user is retrieved; and
e. an execution module for debiting and crediting the user's financial account;
f. wherein after successful identification of the user and successful financial account retrieval, the user is allowed to access the user financial account;
g. wherein no man made tokens such as cards or smartcards are presented for submitting a bid biometric sample.

23. The device of claim 22 wherein the user registers a user personal identification number with the electronic identicator, which is used by the electronic identicator to identify the user.

24. The device of claim 22 further comprising an electronic identicator authentication module wherein a private code, distinct from a personal identification number and not used to gain access to the electronic identicator, is gathered from the user during the user registration step and is presented to only the user during a presentation step, whereby the user is assured that the authentic electronic identicator was used to process the account access.

25. The device of claim 22 further comprising a user account retrieval module, wherein the user assigns an account index code to a user financial account during registration.

26. The device of claim 25 further comprising a user account retrieval module, wherein the electronic identicator retrieves the user financial account number using an account index code contained in the account access request message.

27. The device of claim 22 wherein the user's registration biometric samples are compared to previously designated biometric samples of certain users wherein if a match occurs, the user is determined to have re-registered.

* * * * *

UNITED STATES PATENT AND TRADEMARK OFFICE
CERTIFICATE OF CORRECTION

PATENT NO.   : 6,154,879
DATED        : November 28, 2000
INVENTOR(S)  : Pare, Jr. et al.

It is certified that error appears in the above-identified patent and that said Letters Patent is hereby corrected as shown below:

Title page,
*Attorney, Agent, or Firm*, "Marger Johnson & McCollom, P.C." should read
-- Ali Kamarei, Esq. --

Column 2,
Line 23, "mains" should read -- remains --;
Line 25, "horizon" should read -- authorize --;
Line 27, "N out" should read -- without --;
Line 40, "else" should read -- forced the --;
Line 44, "may also phone" should read -- may also store phone --;
Line 46, "transaction try" should read -- transaction history --;

Column 13,
Line 48, "300-byte authorization" should read -- 300-byte authorization biometric --;

Column 14,
Line 29, "messakes" should read -- messages --;

Column 18,
Line 48, "hardware 1d" should read -- hardware Id --;

Column 21,
Lines 50 and 52, "hardware 1d" should read -- hardware Id --.

Signed and Sealed this

Third Day of June, 2003

JAMES E. ROGAN
*Director of the United States Patent and Trademark Office*